United States Patent [19]
Nelson et al.

[11] Patent Number: 5,745,751
[45] Date of Patent: Apr. 28, 1998

[54] CIVIL SITE INFORMATION SYSTEM

[76] Inventors: Robert W. Nelson, 21675 Hazelnut Sq., Sterling, Va. 20164; Lawrence E. Ireland, 4912 Casimir St., Annandale, Va. 22003

[21] Appl. No.: 631,122

[22] Filed: Apr. 12, 1996

[51] Int. Cl.$^6$ ................................................. G06F 17/30
[52] U.S. Cl. ..................... 395/615; 395/613; 395/919; 395/961; 395/964
[58] Field of Search ........................ 395/613, 615, 395/919, 961, 964

[56] References Cited

U.S. PATENT DOCUMENTS

| | | | |
|---|---|---|---|
| 5,329,464 | 7/1994 | Sumic et al. | 364/512 |
| 5,444,836 | 8/1995 | Hollingsworth et al. | 395/135 |
| 5,448,696 | 9/1995 | Shimada et al. | 395/161 |
| 5,467,444 | 11/1995 | Kawamura et al. | 395/141 |
| 5,568,566 | 10/1996 | Hori et al. | 382/197 |

OTHER PUBLICATIONS

Winstanley et al., "An intergrated project planning environment", IEEE, pp. 91–106, Mar. 17, 1993.

*Primary Examiner*—Thomas G. Black
*Assistant Examiner*—Donald Min
*Attorney, Agent, or Firm*—Jagtiani & Associates

[57] ABSTRACT

A method of creating a coordinate geometry based (COGO) digital civil site information system (CSIS) model that defines with precision and accuracy each site entity by means of data reconciliation, input, and manipulation. Such data is then mined to obtain data that defines information used in the infrastructure management process. The COGO digital CSIS model may also be implemented for a multitude of tasks related to site management and development.

29 Claims, 19 Drawing Sheets

| DRAWING | LAYER INFORMATION | |
|---|---|---|
| PROPERTY | PROPERTY BOUNDARY ← 25<br>MONUMENTS ← 26 | ⎫ |
| EASEMENT | EASEMENT LINES ← 27 | ⎪ |
| BUILDING | BUILDING FACE ← 28 | ⎬ IGVE |
| BASEMAP | ROADWAY CENTERLINES ← 29<br>& BASELINES | ⎪ |
| TOPOGRAPHIC CONTOUR | POINTS ← 97 | ⎪ |
| UTILITY | APPURTENANT STRUCTURES ← 32<br>PIPE CENTERLINES ← 33 | ⎭ |

FIG. 5

| DRAWING | LAYER INFORMATION | |
|---|---|---|
| PROPERTY | | |
| EASEMENT | | |
| BUILDING | | |
| BASEMAP | CURB ← 34<br>CURB & GUTTER ← 35<br>CONCRETE MEDIAN ← 36<br>MISCELLANEOUS ITEMS ← 37<br>EDGE OF PAVEMENT ← 38<br>SHOULDER ← 39<br>PAVEMENT MARKINGS ← 40<br>SIDEWALKS ← 41<br>TRAILS ← 42<br>CONCRETE PADS ← 43 | ⎫<br>⎪<br>⎪<br>⎬ DGVE<br>⎪<br>⎪<br>⎭ |
| TOPOGRAPHIC CONTOUR | INDEX CONTOURS ← 30<br>NORMAL CONTOURS ← 31 | |
| UTILITY | PIPES ← 44 | |

FIG. 6

| DRAWING | LAYER INFORMATION | |
|---|---|---|
| PROPERTY | SITE AREA ← 45 | ⎫ |
| EASEMENT | | ⎪ |
| BUILDING | BUILDING FOOTPRINT ← 46 | ⎬ DP |
| BASEMAP | SIDEWALK AREAS ← 47<br>TRAIL AREAS ← 48<br>PAVEMENT AREAS ← 49<br>PARKING LOT AREAS ← 50<br>OPEN SPACE AREAS ← 51<br>CONCRETE PAD AREAS ← 52 | ⎪ |
| TOPOGRAPHIC CONTOUR | | ⎭ |
| UTILITY | | |

FIG. 7

| DRAWING | LAYER INFORMATION | |
|---|---|---|
| PROPERTY | BEARINGS, DISTANCES ← 53<br>& CURVE DATA<br>PROPERTY CORNER COORDINATES ← 54 | ⎫ |
| EASEMENT | BEARINGS, DISTANCES<br>& TIES TO PROPERTY LINES ← 55 | |
| BUILDING | | |
| BASEMAP | ROADWAY GEOMETRIC LABELS ← 56 | ⎬ DT |
| TOPOGRAPHIC<br>CONTOUR | INDEX CONTOUR LABELS ← 57 | ⎭ |
| UTILITY | | |

FIG. 8

| DRAWING | LAYER INFORMATION | |
|---|---|---|
| PROPERTY | ADJACENT OWNERS ← 58 | ⎫ |
| EASEMENT | | ⎪ |
| BUILDING | BUILDING LABEL ← 59 | ⎬ IT |
| BASEMAP | ROADWAY LABELS ← 60 | ⎪ |
| TOPOGRAPHIC CONTOUR | | ⎪ |
| UTILITY | STRUCTURE NUMBERS ← 61 | ⎭ |

FIG. 9

|  | Edit Row |  |
|---|---|---|
| Current Settings | | |
| DBMS: | dBase3 | |
| Database: | Storm | |
| Table: | STM-PIPE ← 86 | |

- 78 → PIPE_ID#     | 100
- 79 → PIPE_DIA     | 12
- 80 → PIPE_MAT     | CONCRETE
- 81 → PIPE_LENGTH  | 100
- 82 → PIPE_COST    | 2,000
- 83 → PIPE_RUN     | N 03 TO N 02
- 84 → PIPE_DATE    | 12/19/66
- 85 → PIPE_MEMO    | PIPE IN POOR CONDITION

Edit:

[ Ok ]  [ Cancel ]

FIG. 17

```
              Edit Row
Current Settings
  DBMS:      dBase3
  Database:  Storm
  Table:     STM-STR  ↵ 94
```

87 → STR_ID#      | N 02
88 → STR_TYPE     | DI-3C
89 → STR_MAT      | CONCRETE
90 → STR_LENGTH   | 8
91 → STR_COST     | 2,000
92 → STR_DATE     | 12/11/66
93 → STR_MEMO     | STRUCTURE IN POOR CONDITION

Edit:

[ Ok ]   [ Cancel ]

FIG. 18

Storm Sewer Replacement Cost Report ↵ 95
Report Generated 12/16/95
Includes STM-PIPE and STM-STR

| ID# | TYPE | MATERIAL | LENGTH | COST |
|---|---|---|---|---|
| N 02 | DI-3C | CONCRETE | 8 | $ 2,000.00 |
| 100 | NA | CONCRETE | 100 | $ 2,000.00 |
| – | – | – | – | – |
| – | – | – | – | – |
| – | – | – | – | – |
| – | – | – | – | – |
| – | – | – | – | – |

Total Replacement Costs of Storm Sewer Listed =$ 4,000.00 ↵ 96

FIG. 19

CIVIL SITE INFORMATION SYSTEM

BACKGROUND OF THE INVENTION

1. Field of the Invention

The invention is generally related to the field of computer aided design (CAD) systems and specifically provides a technical process for the development of a Civil Site Information System (CSIS) that consists of a coordinate geometry based (COGO) digital CSIS model of a site. The CSIS model is intended for employment as a computerized information support system for infrastructure management.

2. Description of the Prior Art

The problems of data redundancy and a static data environment are eliminated while at the same time the difficulties in updating and verifying information are reduced with the implementation of a CSIS model.

The value of infrastructure information such as road centerline geometry, utility systems, and building locations lies in the fact that it is collected and used in the process of planning for and designing infrastructure improvements. Such information is needed to evaluate the existing infrastructure conditions and provide a basis for decisions pertaining to proposed design improvements and the costs associated with these improvements.

Traditional methods have focused on the preparation of construction documents which exist in a static physical environment as opposed to the development of an intelligent digital model which consists of a seamless spatial and non-spatial database that represents the real world in a dynamic digital environment.

The problem has been that once the data has been gathered and used for its intended purpose no data structure or product presently exists for the retention and updating of information in a useful format. Measures have been adopted in the industry to preserve infrastructure data through the archiving of paper drawings as record copies; however, this approach has many flaws.

Five of the primary flaws in the traditional method of data gathering and preservation are:

inefficiencies in infrastructure data capture data redundancy static data environment difficulty in updating information difficulty in verification of information The traditional approach to information gathering for planning, infrastructure design and infrastructure management has involved numerous players (engineers, surveyors, planners, architects, utility companies) with little understanding of each other's real data needs. Conflicting goals, varying degrees of understanding and opinion with regards to spatial data accuracy, and detachment of design professionals from the data capture process are all reasons why the current process is flawed. Based on the actions of those in the profession it is apparent that a premium has not been placed upon the value of information that is gathered for the purposes of design, otherwise steps would have been taken to preserve the information in a more useful format than merely copying the paper drawings and archiving them on microfilm. The current practice is tantamount to taking intelligent, live data and freezing it so that it is static and no longer intelligent.

The current information capture process starts with a resultant needless expenditure of money by the owner, each time a site is re-visited because the data preservation methods in place are archaic and not set up to accommodate digital information. Rather than establishing a digital record storage system the current course of action in many jurisdictions has been to ignore the advantages of digital technology in favor of remaining with the existing hard copy archiving methods. For example, land records, which form the basis for property boundary plates, are still stored in a hard copy medium as opposed to digitally in some jurisdictions and the difficulties associated with using the data are apparent when the computing for the plat must be done all over again in order to initiate the information gathering process for a redevelopment plan. With the computer technology currently on the market the ability for the data to be stored in digital format is economical, thus eliminating the need for computing the plat over again.

In an ideal world the prudent professional information system modeler performing the design work would like to have geometrically correct spatial data that accurately reflects the conditions of the infrastructure under consideration. The problem has been that it is costly to obtain this information, and when time is of the essence short cuts are taken at the data gathering end because it is the farthest removed from the client who is supplying the firm with funds to perform the work in the first place. The available existing data for the infrastructure must be reviewed so that this determination may be made in an objective fashion prior to field surveying. In the traditional method the information had to be derived all over again for an existing site based on land records research.

The traditional approach employs paper copies of the same area of the site, essentially redundant data, in order to show different types of information. The major problem is that the design environment requires changes to keep the data current and the process becomes an accounting problem that often becomes too difficult due to the time constraints involved.

In the traditional civil engineering approach to information management the product delivered to the owner is a set of paper drawings which do not afford the luxury of query analysis. In this hard copy format the information delivered to the owner is static, non-intelligent, of limited use, and not in a form that could be considered a knowledge product or information asset.

The traditional approach to plan preparation made it difficult for the information to be updated because the drawings were prepared by hand and at a certain scale. The data is repeatedly copied over and over rather than referenced one time to a master file. Even if the drawings were prepared on computer aided design (CAD), the incorporation of new data is difficult without a definite file structure and seamless digital database approach which is currently unavailable.

Current practice for as-built surveys after construction does not involve the preparation of new drawings showing the final location of constructed improvements. Consequently, the infrastructure data is not updated.

The traditional method of verification from static paper drawings involves scaled distances from the plans. This results in a verification of only rough dimensions and lacks the precision which may be gained by employing computer technology currently available on a personal computer.

SUMMARY OF THE INVENTION

It is an object of the present invention to provide dynamic data set which represents a civil site.

It is another object of the present invention to provide a common coordinate system among the drawings which comprise the CSIS model.

It is yet another object to provide a CSIS model which will allow a property owner or his agent to implement, update, and preserve site data pertinent to infrastructure management.

It is yet another object to provide a CSIS model which eliminates inefficiencies in the infrastructure data capture process, eliminates data redundancy, and reduces problems associated with a static data environment updating infrastructure information and verification of infrastructure information.

It is yet another object to provide a CSIS model which comprises an integrated spatial and non-spatial database.

It is yet another object to provide a CSIS model which may be used for management decision making functions such as development, planning and facilities management.

It is yet another object to provide a CSIS model which provides cost savings and efficient use of information in the development, planning and life-cycle management of real property.

The CSIS model is developed, implemented and preserved in five distinct phases as shown in FIG. 1. The first three phases focus on the asset development 6 of a digital asset which consists of spatial 9 and non-spatial 10 portions of the digital CSIS model. In the fourth phase the focus is on asset implementation 7 as the CSIS model is implemented for its intended purpose. Finally, the fifth phase concentrates on asset preservation 8 of the CSIS model for future implementation in the infrastructure management process.

The primary focus of Phase I, as indicated by reference numeral 1 in FIG. 1, is to reconcile existing plan and digital file information and develop a coordinate geometry based (COGO) spatial model. The plan and file information is reconciled and used to develop a COGO digital CSIS model of the property as opposed to digitizing or scanning methods. The land characteristics such as: legal property boundary, easements, buildings, roads, topographic contours, and utilities are modeled in the CSIS spatial database which consists of a minimum of five drawing files. The use of COGO insures that all drawing entities are created after a conscious decision was made as to geometric location of the entity by the designer as opposed to conventional scanning, sketching or tracing.

Professional engineers experienced in both design and management of spatial databases should develop the COGO digital CSIS model so that data integrity of information in the CSIS model is such that it may serve the needs of the professional designer attempting to solve infrastructure management problems. By taking a systems approach to the development of the COGO digital CSIS model engineers will gain an understanding of the utility systems on the site and the impacts of the site utilities on adjacent properties. In this way an opinion of the existing infrastructure condition is established before costly field surveys are initiated.

Phase I of the CSIS development method provides the foundation for the phases that follow by the establishment of a system of independent drawing files as shown in FIG. 3, a hierarchy of geometric entity creation as shown in FIG. 4, and a layering convention for layer management within the drawing files as shown in FIGS. 5, 6, 7, 8, and 9. The independent drawing files, hierarchy of geometric entity creation and layering convention are established to generate a basis for ordering the information so that it is accessible and useful as a management tool for decision makers.

By establishing layer standards the information in the drawing is ordered and thus manageable. The spatial database that composes a single drawing may be readily updated with new survey data that has been collected to reflect as-built conditions. The process of database preservation is in the hands of the owner who may readily verify the accuracy of the survey data by checking it with the use of control monumentation network established in Phase II, as indicated by reference numeral 2 in FIG. 1, of the CSIS method.

Phase II focuses on the establishment of a control monumentation network, field verification, and adjustment of the COGO digital CSIS model. The field survey work performed in Phase II, as indicated by reference numeral 2 in FIG. 1, uses the CSIS model as a point of beginning. The CSIS model is the owner's management tool for directing the efforts of the survey crews and verification of the data received. Without a system of checks and balances of field data, the proposed work may be in error due to an error not detected at the field survey stage of the project. Quality in the final product is enhanced and cost savings are possible when the owner has the ability to direct the efforts of consultants in a proactive fashion.

The control monumentation network is established and a traverse around the loop is performed. The monument locations are added to the COGO digital CSIS model to serve as the tie in points for the translation and rotation of updated survey data into the spatial digital model. The field verification in Phase II serves to provide the basis for the adjustment of the spatial database since the drawing itself may be viewed as a database of coordinates (x,y,z) connected by lines and arcs. With field verification and adjustment of the CSIS model complete, an accurate digital spatial model of the existing conditions on the site that reflects the design intent is completed.

The control monumentation network provides the owner with the capability of adding new survey data to the existing COGO digital CSIS model by inserting data as a block or by attaching it as an external reference. Due to the fact that the CSIS methodology focuses on the development of a COGO digital CSIS model, adherence to strict accuracy standards and data structure in terms of file type and layering conventions are essential in order to maintain the integrity of the data in the CSIS model.

By developing the spatial model from existing plan and drawing file information that the owner has already paid for and using this data as the basis for field verification, the graphical representation of the infrastructure exists in a coordinate-correct COGO digital CSIS model. The spatial model in digital format is used as a base for the attachment of a non-spatial database in Phase III of the CSIS development method.

Phase III, as indicated by reference numeral 3 in FIG. 1, focuses on the development of a non-spatial database which describes the entities in the spatial database. The association of non-graphical information with graphical information increases the intelligence of the drawing and makes data inquiry commands more comprehensive. A priority in the development of both the spatial and non-spatial databases is the focus on insuring that the data is correct and resident in the system only once. This elimination of redundancy in the data allows the COGO digital CSIS modeler to take advantage of CSIS's ability to externally reference other drawings or insert information as a block into another drawing. With the external referencing feature any changes to the original or master drawing file are updated in the other drawing files which reference it. The partitioning of data in this fashion aids in the preservation of the system by making updates efficient and easy. The segregation of data into common themes allows for effective management of the information while CSIS readily integrates the system as a whole due to the fact that all of the spatial data has a common origin point of 0,0,0.

The non-spatial database integration with the COGO digital CSIS model increases the amount of attribute information that is available for describing the spatial entities. The data resides in the owner's hands as an accessible, verifiable, versatile, accurate, and useful management tool.

The features of CSIS make this integrated database of linked spatial and non-spatial descriptive information inherently more intelligent than hard copy or paper drawings. CSIS provides the ability to link one drawing to another as an external reference or insertion as a block. One may plot the drawing at any scale since the data resides in the drawing at final scale in real world units. Two dimensional drawings may serve as the basis for three dimensional models. The inquiry commands of CSIS allow the decision maker to work with the model to explore options and answer questions about distances, angles, areas, and coordinates. Finally, the layer control of CSIS allows the manager to order information by color, linetype, line weight, name, and visibility.

The management tool is now in place in the form of an integrated spatial and non-spatial database which depicts the existing geometric conditions on the site and constitutes the CSIS model. The CSIS model is now used as the point of beginning for all future development, planning, and facilities management needs on the site at a cost savings to the owner.

In Phase IV, as indicated by reference numeral 4 in FIG. 1, the CSIS model is implemented in a proactive fashion as the basis for the following activities:

1. Development:
    Site Plans
    Site Plan Waivers
    Stormwater Management Studies
    Drainage Studies
    Survey Coordination
    Utility Relocation Plans
2. Planning:
    Preliminary Plans
    Parking Studies
    Conceptual Studies
3. Facilities Management:
    Capital Improvement Forecasting
    Pavement Management
    Sign Inventory Plans
    Infrastructure Management The CSIS model allows the management team to build upon the existing knowledge of the site and the related utility systems rather than beginning from a new survey each time capital improvements are proposed on the site. Funds and effort are allocated based on the severity of need as established by the Facilities Management team using the CSIS model, with up-to-date infrastructure data, as a decision making tool.

Cost estimating is based on the infrastructure geometric data as defined in the CSIS model. The quantity of materials required to bring the infrastructure from the existing state as defined in the current CSIS model to the proposed condition is defined during design by using the data in the CSIS model to derive construction plans. Since the construction plans are developed using the CSIS model as the point of beginning the amount of materials used in construction is a derivative of the model. Cost computations are performed by data extraction from the non-spatial database portion of the CSIS model. Once construction is complete, the as-built conditions are measured and the CSIS model is updated with the new infrastructure data in Phase V.

The primary focus of Phase V, as indicated by reference numeral 5 in FIG. 1, is the preservation of the owner's investment in the CSIS model so that it is kept current and may be used in the future for development, planning, and facilities management.

The CSIS development method describes the rationale behind the development of a COGO digital CSIS model of the infrastructure. Phases I and II focus on the development of the spatial model 9, first in Phase I by utilizing the data that the owner has already invested in to develop an opinion of existing infrastructure conditions and, second in Phase II, by using this spatial model as the basis for gathering field survey information to verify the existing record information and adjust the spatial model. The spatial digital model is enhanced and increased in intelligence by the development of a non-spatial attribute database 10 in Phase III which further describes the spatial entities modeled in the first two phases. The establishment of a spatial database in Phases I and II and the linking of the spatial database with a non-spatial database in Phase II completes the CSIS model which is an infrastructure management tool, and a capital asset 6, that decision makers may implement, as indicated by reference numeral 7 in FIG. 1, for development, planning, and facilities management functions in Phase IV. The CSIS model is updated in Phase V in order to preserve, as indicated by block 8, the owner's investment in the information, and perpetuate the cycle, as indicated in block 11, of efficient infrastructure management.

Other objects and features of the present invention will be apparent from the following detailed description of the preferred embodiment.

BRIEF DESCRIPTION OF THE DRAWINGS

The invention will be further described in conjunction with the accompanying drawings, in which:

FIG. 5 shows independent geometric vector entities;

FIG. 6 shows dependent geometric vector entities;

FIG. 7 shows dependent polygon entities;

FIG. 8 shows dependent text entities;

FIG. 9 shows independent text entities;

FIG. 17 shows an example of a database table for attributes that would define STM-PIPE appurtenances, FIG. 18 shows an example of a database table for attributes that would define STM-STR appurtenances; and FIG. 19 shows an example of an output of a storm sewer replacement cost report.

DETAILED DESCRIPTION OF THE PREFERRED EMBODIMENT

Figure 1:
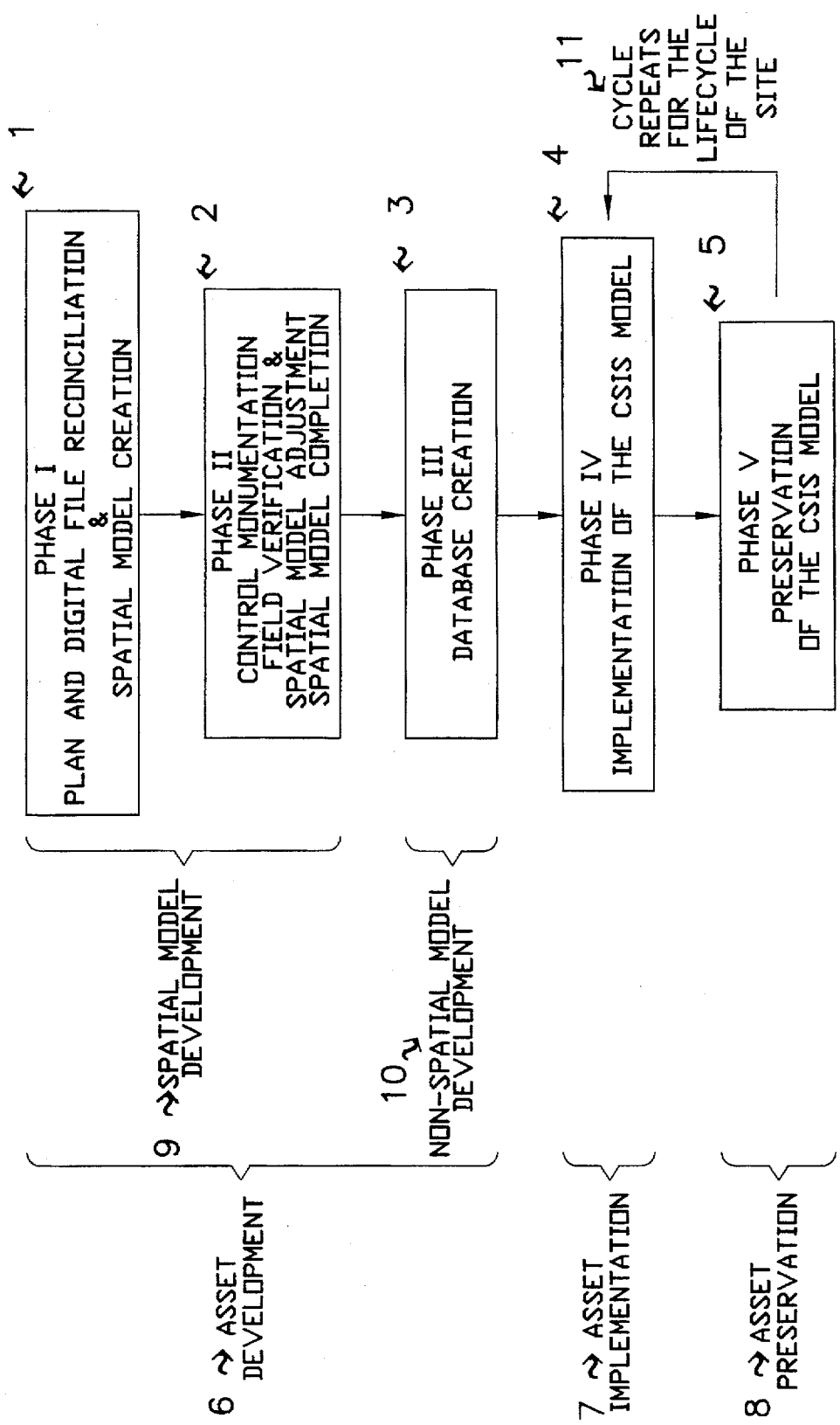
FIG. 1 shows a detailed flow chart of the entire Civil Site Information System (CSIS) method.

FIG. 1 presents a schematic of a preferred embodiment for the method of developing a Civil Site Information System (CSIS).

PHASE I

Figure 2:
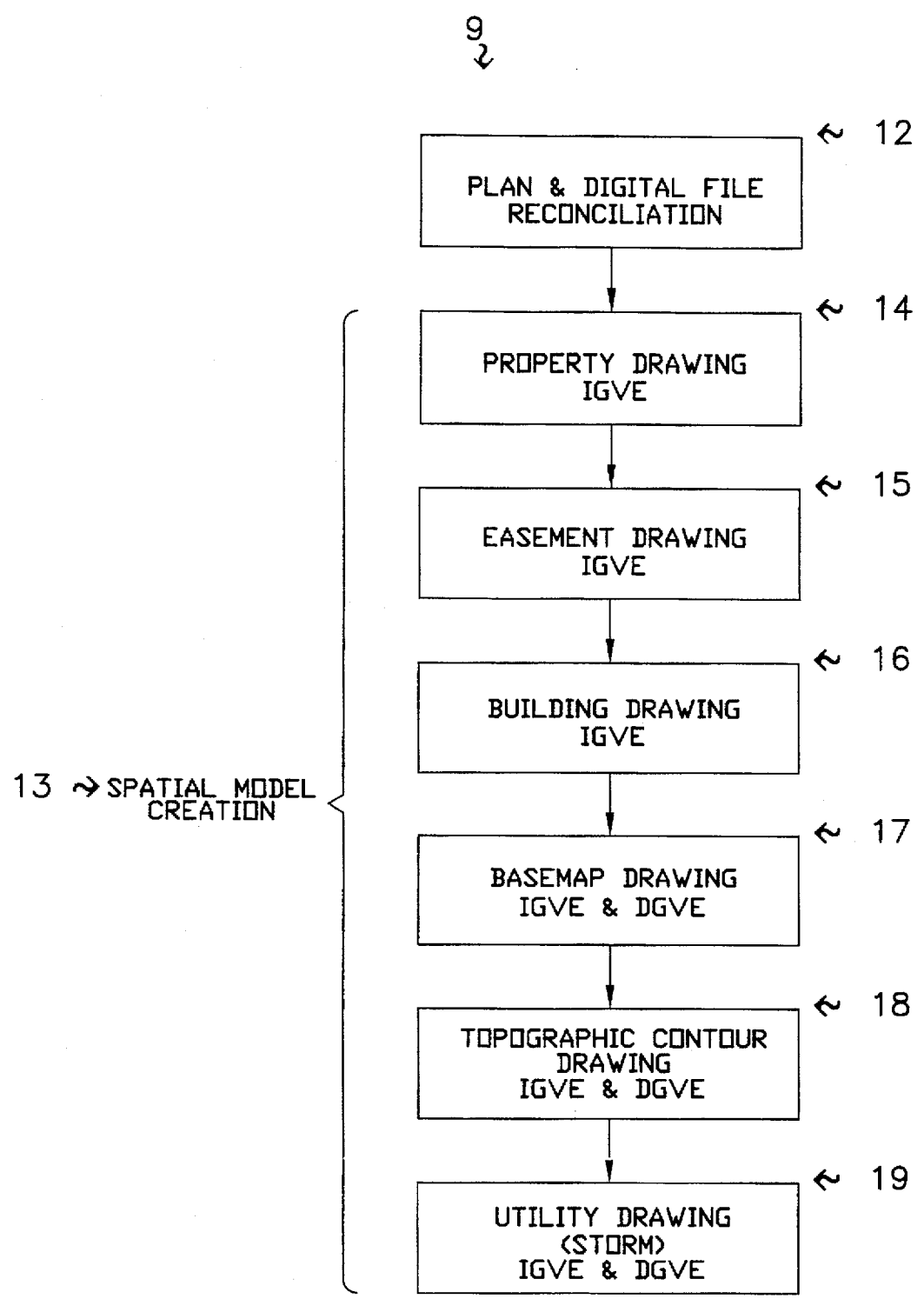
FIG. 2 shows a detailed flow chart of Phase I.

The CSIS method, as illustrated in FIG. 1, begins with Phase I, as illustrated in FIG. 2, in which all existing plan and digital file information is gathered, reconciled 12, inventoried and used to develop a coordinate geometry (COGO) based digital CSIS model of the site and its infrastructure. The CSIS model developed in Phase I is a digital model in which the primary focus is to reconcile the existing plan and digital file data as shown in step 12 in FIG. 2. The COGO, or computational, aspect of the CSIS model means that all points in the model are input with absolute coordinates and that all lines and arcs are created to real world dimensions after a conscious decision has been made as to the geometric placement of the entity that is consistent with the designer's original intent. There is no tracing, sketching, imaging, edge-matching, rubber sheeting, or scanning with subsequent raster to vector conversion, involved in the CSIS model development method. It should be appreciated that this is a significant departure from prior art systems.

Figure 16:
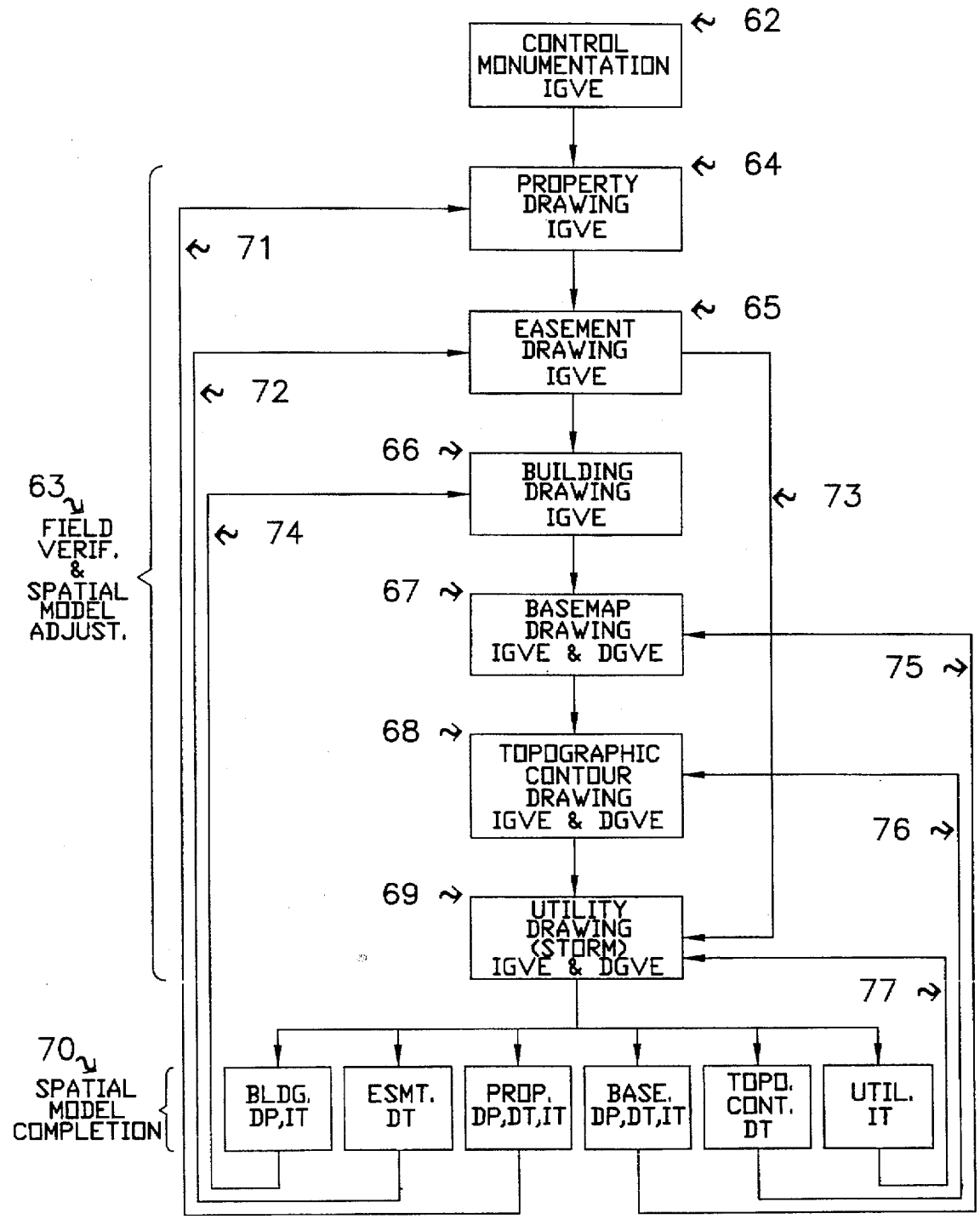
FIG. 16 is hows a detailed flow chart of Phase II.

The justification for the undertaking of COGO digital CSIS model development prior to field survey work is founded in the need to plan for and define the scope of field survey work in infrastructure data collection. By first reconciling the existing plan and digital file information, and then developing a COGO digital CSIS model, a deed sketch and search ties for property corners are derived from the Phase I process prior to field verification in Phase II as illustrated in FIG. 16. Furthermore, an understanding of the utility systems and the approximate location of appurtenant structures is critical to the performance of a comprehensive and cost effective field data collection effort that does not inadvertently omit appurtenant structures that are relevant to the utility systems on the site. This understanding and opinion of the existing utility systems is gained after a review of the plan and digital file information and prior to going to the field for verification. The value of existing information that has been paid for by the owner and preserved on disk and hard copy records is recognized in the CSIS method and every attempt is made to reconcile the data and preserve the owner's investment in this existing plan and digital file information. It is anticipated that digital data will become the existing record for infrastructure data in the future.

It should be appreciated that the CSIS method is not just a data collection and mapping method but rather a method of data reconciliation and digital model creation that provides a definitive data structure for infrastructure information. The infrastructure information is reconciled and modeled with the intent of the original design so that future employment of the data may begin with a cost savings by using the digital CSIS model as the point of beginning as opposed to having to gather the infrastructure information from multiple sources, reconcile it, and compute the data all over again. The CSIS method creates a digital model in which the most current infrastructure data is preserved and available in a digital format that is functional.

Figure 3:
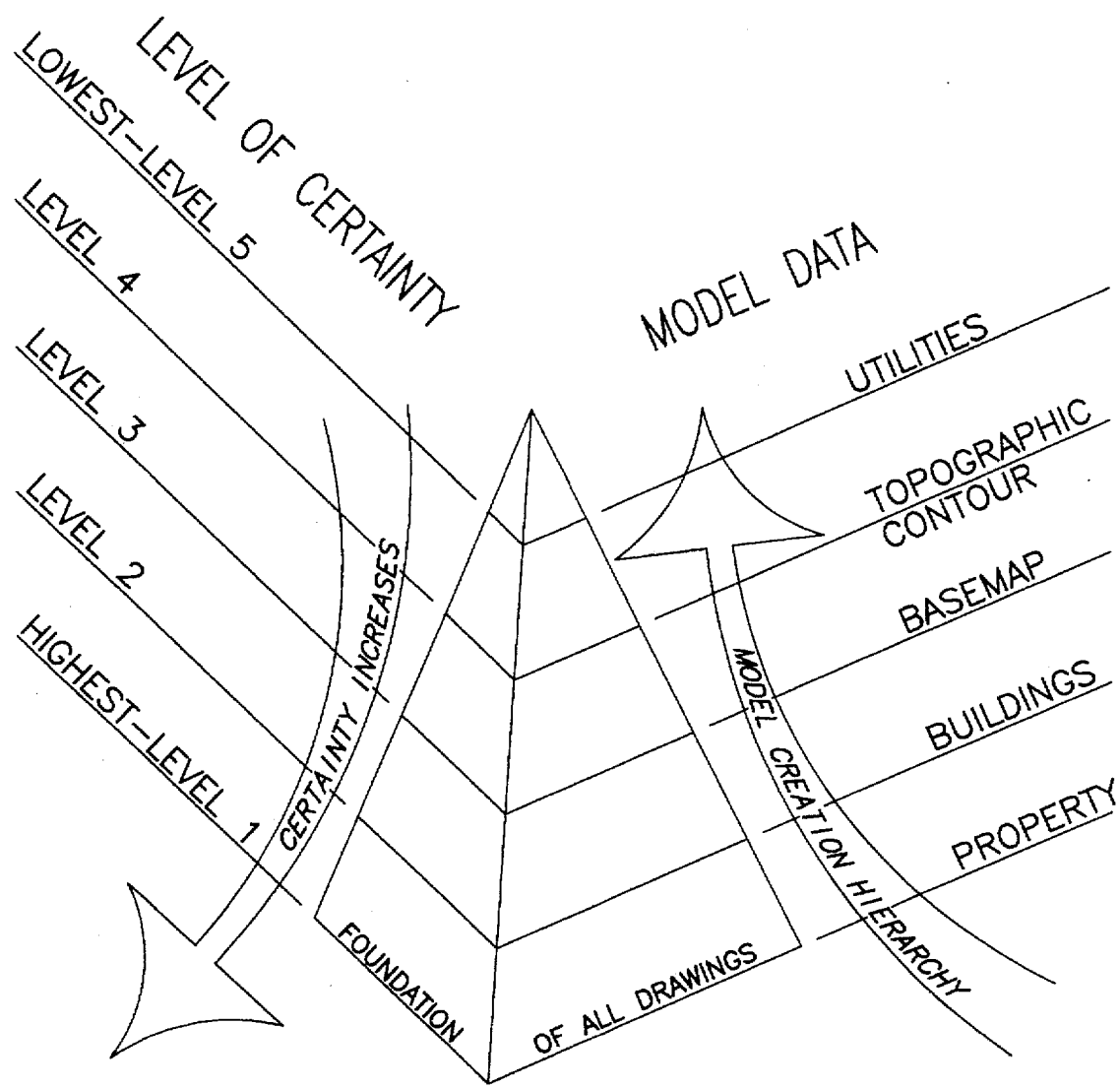
FIG. 3 shows a hierarchy of data certainty pyramid.
Figure 10:
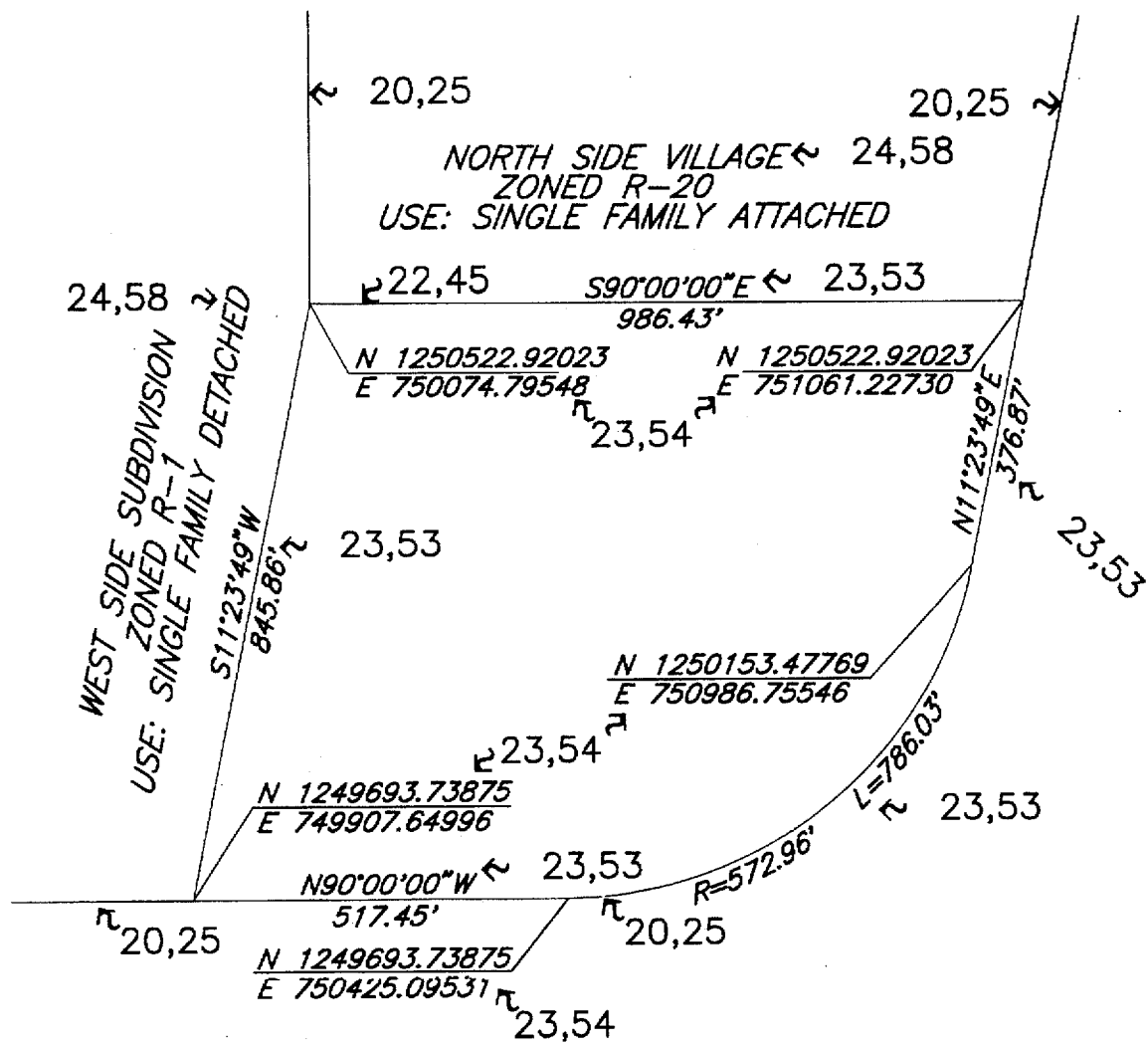
FIG. 10 shows the legal boundary of the site with bearings, distances, and curve data of each property line, coordinates of each property corner, with adjacent property owners shown in a property drawing.
Figure 11:
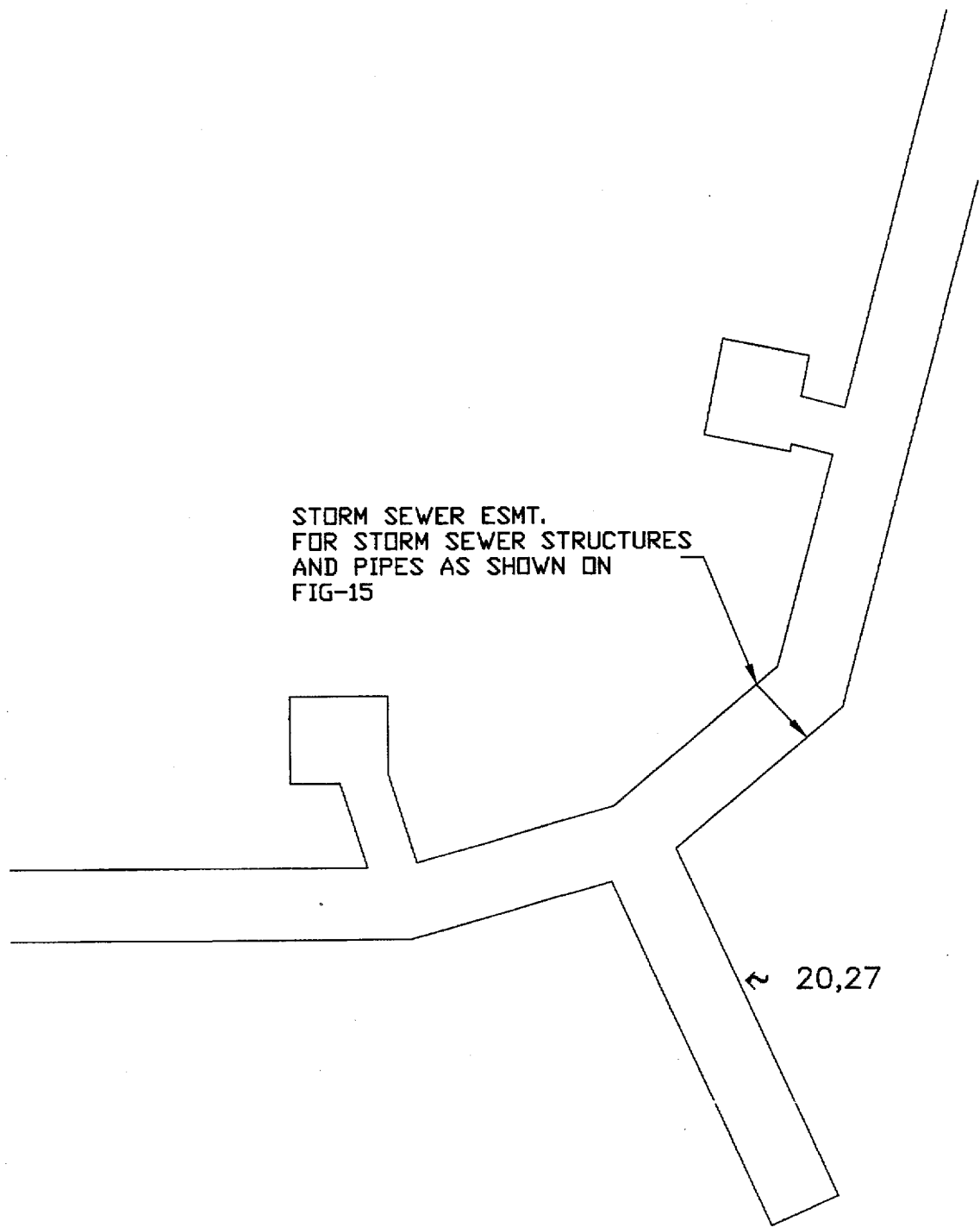
FIG. 11 shows a typical storm sewer easement in an easement drawing.
Figure 12:
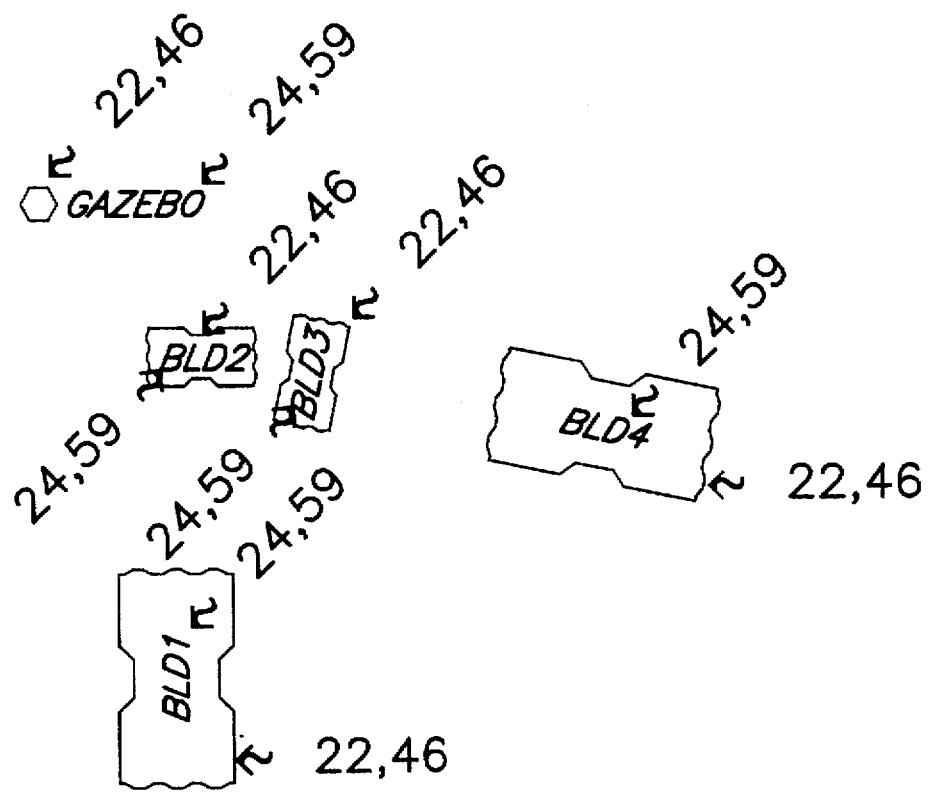
FIG. 12 shows the outline of each building on the site along with any building information shown as an attribute 'driven block and said drawing may contain underground tunnels from one building to another building in a building drawing.
Figure 13:
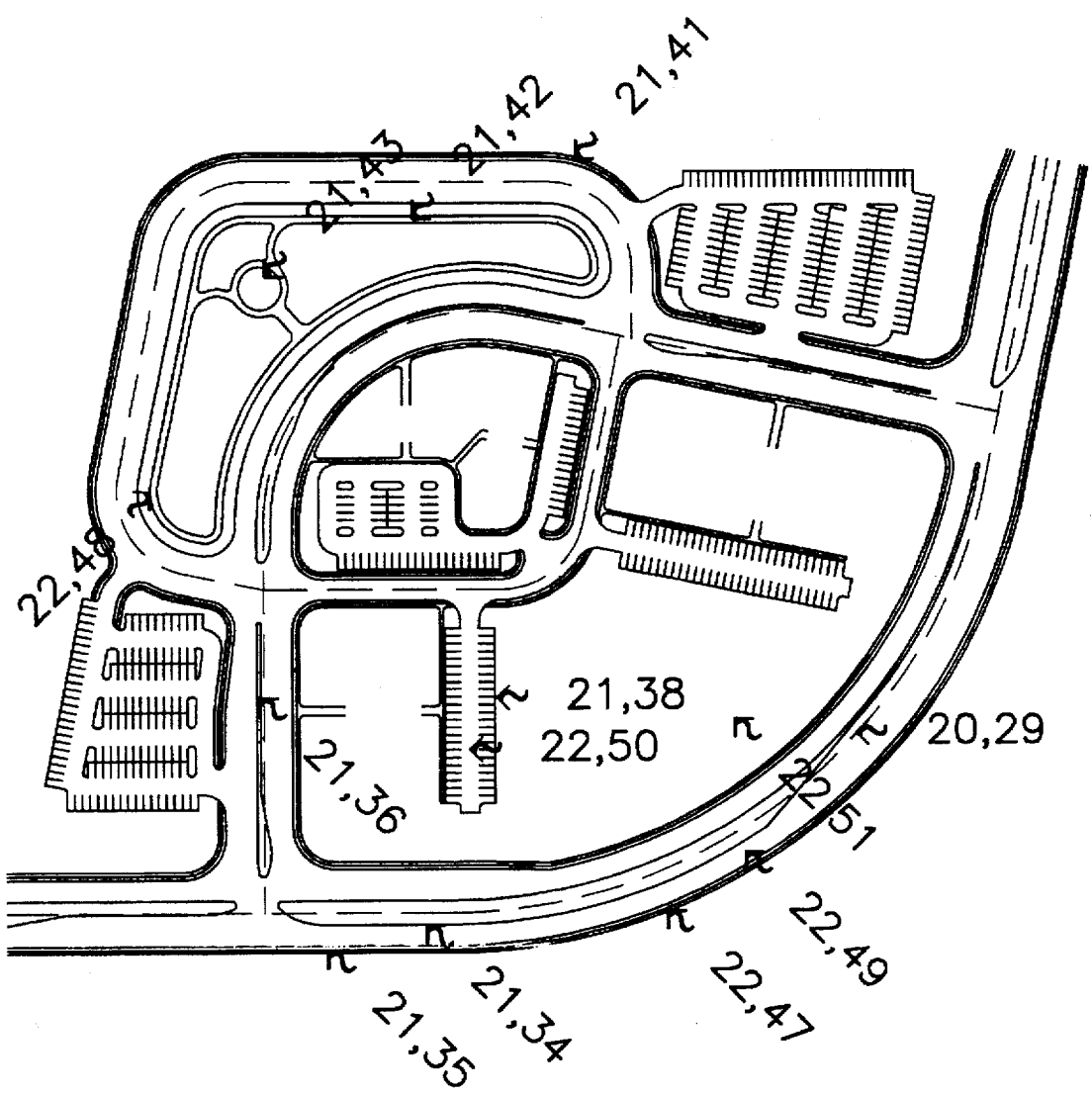
FIG. 13 shows the planimetric features of a site including but not limited to; sidewalks, curb and gutters, edge of pavements, steps, stairs, retaining walls, handicap ramps, loading ramps, loading docks, asphalt ditches, concrete ditches, concrete channels, concrete pads, etc. in a basemap drawing.
Figure 14:
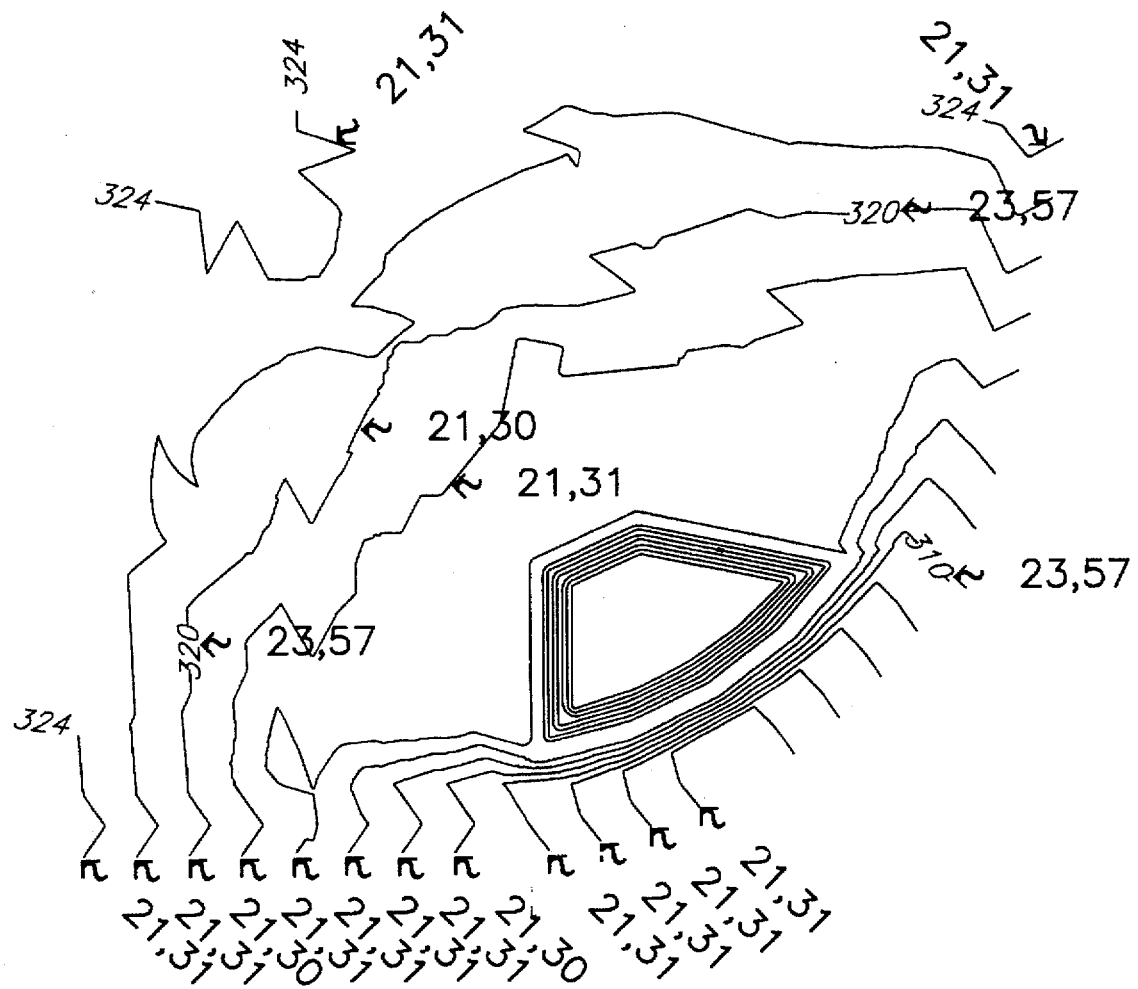
FIG. 14 shows the contours and elevations labeled that were generated from the TIN model in a topographic contour drawing.

After reconciliation of the existing plan and digital file data, as indicated by block 12, the CSIS model is derived based on this existing infrastructure information which exists in a hierarchy of data certainty as shown in FIG. 3. The CSIS model is created by developing independent drawings which contain the most certain infrastructure data first and then utilizing these drawings as the geometric basis for the subsequent drawings that contain less certain data. The digital spatial model created in Phase I, as shown in FIG. 2, consists of a minimum of five independent drawing files as shown in FIG. 3. These drawing files which define the infrastructure are property, building, basemap, topographic contour, and utility, and are illustrated in FIGS. 10, 12, 13, 14, and 15, respectively. A temporary drawing file for easements called the easement drawing, as shown in FIG. 11, is established for each utility in order to facilitate the management of the easement information. The temporary easement drawings are inserted into the appropriate utility drawings in step 73 as illustrated in FIG. 16 in the CSIS method.

All of the drawing files are based on the same coordinate system to allow for insertion of data or referencing of the files without the need for translation and rotation of data. The CSIS modeler must determine the number of drawings that will constitute the CSIS model and adequately represent those infrastructure items that need to be managed on a site-by-site basis depending on the needs of the property owner. For the purposes of the present invention, five independent drawing files are the minimum number of drawings required that will constitute the CSIS model. These drawing files are proposed to structure the data pertinent to infrastructure management. It is important to note that the CSIS model is not limited to a specific number of drawing files because the infrastructure data management requirements of property owners will vary and the separation of data into a larger number of files may be desirable.

CSIS model development begins with the COGO input of the most certain infrastructure data into a drawing to provide the geometric foundation upon which the less certain infrastructure data may be based. Just as each drawing file falls within a hierarchy of data certainty that defines the order in which the drawings are created, as shown in FIG. 3, the data within each drawing file is created and structured based on a hierarchy from the most important data being created first and serving as the geometric base for the least important data, which is created last, as shown in the hierarchy of data types shown in FIG. 4. The data in the order of its importance from the most important to the least important is independent geometric vector entities (IGVE) 20, followed by dependent geometric vector entities (DGVE) 21, dependent polygons (DP) 22, dependent text (DT) 23, and finally independent text (IT) 24. As the most important entities in the spatial database, the independent geometric vector entities 20 are created first for each drawing in the CSIS model. All other spatial information in the drawing file is either derived from the independent geometric vector entities 20 or it is independent text 24 that is descriptive in nature.

Furthermore, the geometric elements of the digital CSIS model are of more importance than the descriptive text elements, both dependent 23 and independent 24, for the following reasons. First, the dependent text 23 is derived from geometric elements once and made a part of the CSIS model for the sake of efficiency so that the data does not have to be derived over and over again. Second, the independent text 24 is unrelated to both the physical world and the design intent that the model represents and is included to provide a description of the model to meet a jurisdictional requirement.

Phase I of the CSIS method concentrates on the geometric modeling of only the independent 20 and dependent geometric vector entities 21. These elements are required to provide the basis of opinion for the field survey work involved in the collection of infrastructure data. Only after these elements of the CSIS model have been field verified and adjusted in Phase II, step 63 in FIG. 16, to reflect the designer's intent or as-built conditions are the dependent polygons 22, dependent text 23, and independent text 24 added to the CSIS model, see step 70 in FIG. 16.

Independent geometric vector entities 20 are created on their own layers, as shown in FIG. 5, to allow for data management based on visual qualities both on the computer screen as well as on hard copy output. Such visual qualities as color, line width, and line type allow the user to order information on the computer screen. The line weight of an entity is a function of the output device (plotter) and also affords management of the data based on visual qualities.

Dependent geometric vector entities 21 are created on their own layers, as shown in FIG. 6, and are derived from the independent geometric vector entities 20. They are related to the independent geometric vector entities 20 by specified angles and distances from these entities. Their relative importance in the CSIS database is less than that of the independent geometric vector entities 20 because it is possible to re-create them from the independent geometric vector entities 20.

Dependent polygons 22 are derived from the independent 20 and dependent geometric vector entities 21 and are next in importance in the CSIS database. These entities reside on their own respective layers as shown in FIG. 7. The need for dependent polygons 22 stems from the nature of infrastructure data management in which it is often necessary to know the area of a particular feature. Far from being redundant, these dependent polygons 22 have area as an embodied entity feature, and are manipulated by layer management commands to make the data readily available to the end-user. The CSIS model is distinguished from a mere model of existing infrastructure characteristics by elements such as these dependent polygons 22 which build knowledge into the model and the ability to efficiently employ the CSIS model as an infrastructure management tool.

Figure 4:
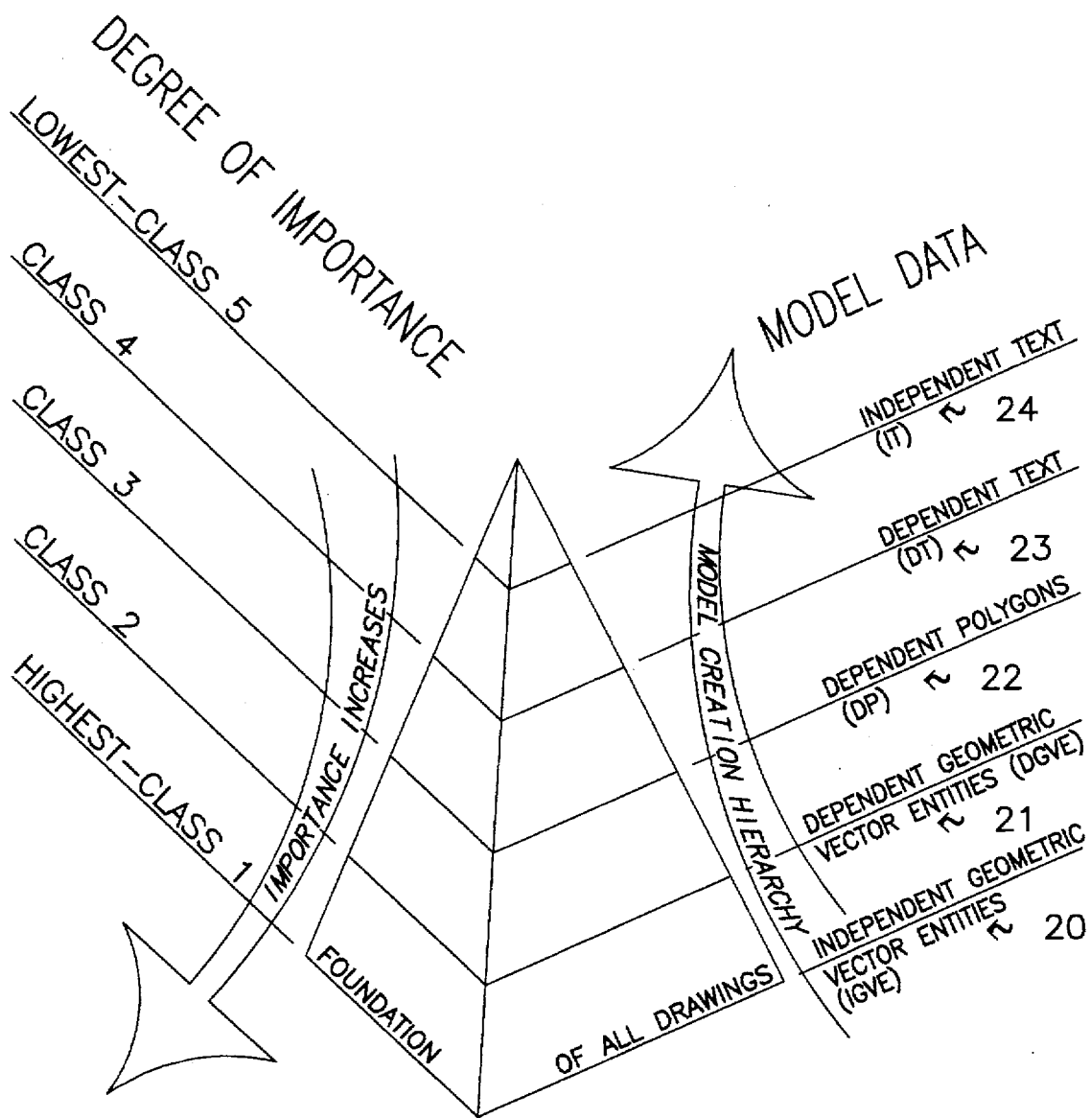
FIG. 4 shows a hierarchy of data types pyramid.

The next element in the hierarchy of data importance, as illustrated in FIG. 4, is the dependent text 23 which is descriptive information that is based on the independent 20 and dependent geometric vector entities 21. It is the intent of the present invention to make this information resident in the model as text data so that it is readily available through layer management and does not have to be derived from query commands on the independent 20 and dependent geometric vector entities 21. While it is possible to derive this information by query commands in CSIS, this data is such that it is required in many different infrastructure management applications. By dependent text 23 on its own layers, as shown in FIG. 8, it is manageable, readily available for reference and does not have to be developed from query commands of entities in the drawing each time it is needed.

The least important data in the CSIS model is the independent text 24 which is descriptive data which may not be derived from query commands of geometric vector entities in the drawing. It resides on as many layers as are needed, as shown in FIG. 9, to categorize the data. Independent text 24 is added to the model where applicable due to a specific need in the infrastructure management process for descriptive information that may be required for a local jurisdiction or approval authority. For example, independent text 24 may be data related to zoning regulations or it may detail the adjacent property owners.

After plan and digital file reconciliation 12, spatial model creation 13 begins with the development of a property drawing, as indicated by reference numeral 14 in FIG. 2. The property boundary independent geometric vector entities 20, consisting of lines and arcs 25 and depicted in FIG. 10, are resident on their own layer as shown in FIG. 5. The boundary plat or deed information associated with legal transactions of the Real Property represents the most certain element of infrastructure information. This data is derived from field verification of actual property corners so it represents the most accurate basis upon which to found the other elements of the CSIS model.

The independent geometric vector entities 20 that make up the site's legal property boundary are entered into the CSIS model by using coordinate geometry with absolute coordinates and real world dimensions. In this way the information foundation of the CSIS model is based on a COGO digital real world model of the site's legal property boundary as recorded in the Land Records of the local government offices. Upon completion of the independent geometric vector entities 20 in the property drawing, as indicated by reference numeral 14 in FIG. 2, the easement drawing is created, as indicated by reference numeral 15 in FIG. 2.

The creation of the independent geometric vector entities 20 in the easement drawing, a portion of which is depicted in FIG. 11, is done by using the property drawing as a geometric base. All recorded utility easements are entered into the easement drawing using coordinate geometry with absolute coordinates and real world dimensions. To perform this task a separate easement drawing is created for each utility's easements while using the property drawing's independent geometric vector entities 20 as the geometric base. The easement drawing is a temporary drawing that is utilized to order the easement information for each individual utility. It is inserted into the respective utility drawing and becomes a resident part of that utility drawing after field verification and spatial model adjustment in Phase II. For the purposes of the present invention only a storm sewer easement drawing will be developed to illustrate the method. The same methodology applies for all utilities that may exist on the site.

The easement drawing, as indicated by reference numeral 15 in FIG. 2, components that are created in Phase I are independent geometric vector entities 20. These entities are created on their own layer 27, as shown in FIG. 5, for the reasons mentioned earlier. The storm sewer easements are created in a separate drawing so that the data may be inserted into the utility drawing (storm), a drawing to be created in step 69 on FIG. 16 of the CSIS method, which will model the storm sewer pipes and appurtenant structures. The CSIS method follows this approach because the easement drawings are tied to the site boundary for future reference when they are created and they are in a format that specifies bearings and distances. Easement plats are prepared with attention to precision and with distance ties to the property boundary, so reference to the independent geometric vector entities 20 in the property drawing is required to enter the easement information into the CSIS model.

In the process of entering the easement information into the drawing, the record basis of bearing and a point of translation and rotation must be decided upon. The CSIS model employs the property boundary modeled in the property drawing as the basis of bearing for all easement plats used in the generation of the easement drawing. Prior to the invention of the CSIS a common frame of reference or coordinate system (origin at 0,0,0) for infrastructure data has not existed. The CSIS is founded upon a common coordinate system so that data preservation (digital model creation) is facilitated and data integrity is maintained.

Coordinate system standards do exist; however, current practice allows the interpretation of the coordinates for a particular point on the ground to be determined by the individual engineer or surveyor. Two professionals will agree on the relative position of features but disagree on the absolute coordinates of the features. This creates a problem in infrastructure information management from the property owner's perspective because a resolution process must be performed in order to determine the proper translation and rotation of the data. When one attempts to piece together easement plats that have been prepared over a period of time for utilities on a site, each plat often has its own coordinate system that is different from other plats. To orient the information on the plats the same in relation to each other, one has to translate and rotate the information so that it gains integrity and thus value. The data integrity derived from having a common coordinate system solves the problem of having each easement plat as a discrete element that is not oriented in the same way as other easement plats for the same site.

The building drawing, as indicated by reference numeral 16 in FIG. 2, is created after the creation of the property and easement drawings. The external building face dimensions are derived from the architectural drawings. The individual building faces are represented on a separate layer 28, as shown in FIG. 5, as independent geometric vector entities 20 in the building drawing. By referencing the property and easement drawings, and using the independent geometric vector entities in these drawings as a geometric base, the buildings on the site are located in relation to the property lines and zoning setbacks.

The creation of the basemap drawing, as indicated by reference numeral 17 in FIG. 2, is the next step in the CSIS method. The road centerline/baseline geometric elements are defined as independent geometric vector entities 20 on a separate layer 29, as shown in FIG. 5, in the first step in the development of the basemap drawing by referencing the property, easement, and building drawings and using the independent geometric vector entities 20 resident in these drawings as the geometric base to facilitate COGO input of the information.

With the centerline/baseline information established, the curb 34, curb and gutter 35, concrete median 36, miscellaneous items 37, edge of pavement 38, shoulder 39, pavement markings 40, sidewalks 41, trails 42, and concrete pads 43 are modeled on separate layers, as shown in FIG. 6, as dependent geometric vector entities 21 which are based geometrically off of the centerline/baseline elements. The geometric base that is employed to make certain that the dependent geometric vector entities 21 are correctly entered into the basemap drawing consists of the independent geometric vector entities 20 in the property, easement, building, and basemap drawings.

With the completion of independent and dependent geometric vector entities 20,21 in the property, easement, building and basemap drawings the required information base for the preparation of the topographic contour drawing, as indicated by reference numeral 18 in FIG. 2, is in place. To create the topographic contour drawing the elevation data from existing site plans and digital files are employed to derive points, nodes with z,y, and z components, which are independent geometric vector entities 20, and reside on their own layer 97 as shown in FIG. 5. The point file is used as the basis for the creation of a Triangulated Irregular Network (TIN). Elevation data for areas not covered by existing data files may be derived by as-built plans. The owner should be informed on the coverage of existing digital file information and how to proceed in collecting the data for digital terrain modeling (DTM) work that will provide the most accurate data model.

In the derivation of the point file the property, easement, building, and basemap drawings are referenced and the independent and dependent geometric vector entities 20,21 resident in these drawings are used as the geometric base for point location. The development of the TIN is performed by a digital terrain modeling (DTM) software program, such as one commercially available from Research Engineers, inc., which is capable of reading CSIS files and performing the computations required to generate topographic contours. The topographic contours, both index and normal 30,31, are dependent geometric vector entities 21, which reside in the topographic contour drawing on separate layers, as shown in FIG. 6, and not in the basemap drawing because the file is generally large, depending on the size of the site.

The utility drawing (storm), as indicated by reference numeral 19 in FIG. 2, which is the representative typical utility drawing in the description of the CSIS method, is developed upon completion of the independent 20 and dependent geometric vector entities 21 in the property 14, easement 15, building 16, basemap 17, and topographic contour drawings 18. The information required for the input of the storm sewer system into the CSIS model is found on the existing site plans, on public works records, and on easement documents for public and privately maintained storm sewer lines. By referencing the independent 20 and dependent geometric vector entities 21 in the property, easement, building, basemap, and topographic contour drawings and using this information as a geometric base for COGO input, the storm sewer appurtenant structures 32 and storm sewer pipe centerlines 33 are modeled in the utility drawing (storm). Whenever possible, such as where a station and offset for a storm sewer structure from a road centerline is given on a plan, coordinate geometry is used in the creation of the utility drawing (storm). Both the storm sewer appurtenant structures 32 and pipe centerline entities 33 are independent geometric vector entities 20 and reside on separate layers in the utility drawing (storm) as shown in FIG. 5.

Upon completion of the modeling of all of the storm sewer appurtenant structures and pipe centerlines the storm sewer pipe entities 44 are created on their own layer as shown in FIG. 6. The storm sewer pipes are dependent geometric vector entities 21 which are derived from offsetting the pipe centerline entities one half of the pipe diameter. In the modeling of the storm sewer system all structures and underground pipes are developed to real world dimensions within the CSIS model. Utilization of elements of the COGO digital CSIS model at a cost savings is then possible at a future date when a detailed construction drawing of a storm sewer structure is required.

Upon completion of the utility drawing (storm), Phase I in the CSIS method is completed. The Phase I development of a COGO digital CSIS model consisting of six drawings, five permanent and one temporary, accomplishes the Phase I goals of plan and digital file reconciliation 12, structuring the infrastructure data, and creating a digital model for use in the field verification process in Phase II.

PHASE II

The COGO digital CSIS model created in Phase I serves as the point of beginning for the field verification and spatial model adjustment process in Phase II. It is employed as the owner's basis of opinion and management tool for directing the efforts of the survey crews, and verifying the data collected. The CSIS model serves as the basis for computed search ties to property corners, the approximate location of existing utility systems, and definition of the scope of survey work.

Modern survey data collection technology allows the coordinates of points (x,y,z) on the ground to be determined with a high degree of accuracy. The trend in the technology of field data collection is towards even greater accuracy at less cost for the hardware. Electronic Total Stations and Global Positioning Systems (GPS) may be employed to obtain accuracy in point location that in the past were not possible. This is true to the extent that reliance on a surveyed baseline for geometric layout may give way to a coordinate approach whereby points are located by radiating to them off of a control monument network with coordinates derived from the CSIS model. Without a coordinate correct digital model such as the CSIS this approach is not possible. The CSIS model allows the benefits of the advancing technology to be effectively employed.

The intent of the CSIS method in the creation of a COGO digital CSIS model is to model the as-built data to reflect the intended design data to the extent possible so that in the future, when an infrastructure improvement project is initiated, the design process does not have to start all over again at additional expense to the owner. Instead, the point of beginning for field survey and engineering design work will be the CSIS model which will embody all of the infrastructure information that was previously compiled and researched for a site from paper and digital file data.

The data in the CSIS model is not merely a reflection of the actual conditions on the site but rather a digital model of the as-built conditions that has inherited all of the original design intent. The CSIS model is a knowledge product that provides a definitive structure for infrastructure information. For example, on a tangent section of roadway where the designer intended a 400 foot section of road to have 24 foot width the CSIS model reflects this even when actual field verification of the road width shows minor deviations from 23.95 to 24.05 feet along the entire tangent section of roadway. If the field data reflects a deviation from the original design that is too large then this is reflected in the CSIS model as an as-built condition. If developed by professionals exercising design judgment, the CSIS model will serve as the information basis for future design on infrastructure management projects for the same site without the need for the owner to reinvest in a designer's time to interpret new field survey data each time. The as-built conditions from the last completed project on the site, as reflected in the CSIS model, will serve as the existing conditions for the next project, thus eliminating the need to go through the expense of another field survey.

The first step of Phase II, as shown in FIG. 16, is the creation of a survey control monumentation network 62 on the site. The monumentation network, once established, is a capital asset that is employed for horizontal and vertical control in field data collection efforts to support CSIS model updating, construction layout, and owner verification of field survey data.

The control monuments are physically set to allow for intervisibilty and balancing of the traverse legs to the extent possible. A traverse is run around the monument loop with an acceptable closure of 1:20,000. Elevations for each monument are established to complete the vertical control for the site. The survey control monumentation network 62 is referenced to the property corners of the site by angle and distance to establish the basis of bearing for data that is collected using the survey control monumentation network 62 as horizontal and vertical control in the future.

Once the physical location of the monuments has been established an appropriate traverse or monument 26 symbol is entered into the property drawing as an independent geometric vector entity 20 on its own layer as shown in FIG. 5. The survey control monumentation network 62 allows the owner to effectively control the field survey process in the future and is an invaluable capital asset that is employed to preserve the data integrity of the CSIS model.

With the survey control monumentation network 62 in place the reestablishment of horizontal and vertical control on the site is no longer needed every time an infrastructure management project is required. The survey control monumentation network 62 provides horizontal and vertical control for any surveyors that need to perform infrastructure data collection on the site. If the survey data collected is tied to two of the control monuments then data may be inserted into the appropriate drawing without the need for translation and rotation by using the control monument network as the geometric frame of reference.

The infrastructure data collected to provide field verification and spatial model adjustment 63 of the elements of the spatial digital model created in Phase I, as shown in FIG. 2, follows the same sequence as the drawing creation. In keeping with the drawing creation hierarchy shown in FIG. 3, the collection of data and spatial model adjustment focuses on the most important elements of the spatial database first, as shown in FIG. 4. Only after these independent 20 and dependent geometric vector entities 21 are correct are the subsequent elements which are dependent upon this geometric foundation created.

As shown in FIG. 16, the property drawing 64 is field verified, adjusted and used as the geometric basis for the adjustment of the easement drawing 65. The property 64 and easement drawings 65 are used as the geometric basis for the adjustment of the building drawing 66. The property 64, easement 65, and building drawings 66 are used as the geometric basis for the adjustment of the basemap drawing 67. The property 64, easement 65, building 66, and basemap drawings 67 are used as the geometric basis for the adjustment of the topographic contour drawing 68. As the last step in the spatial model adjustment 63, due to field verification, the property 64, easement 65, building 66, basemap 67, and topographic contour drawings 68 are used as the geometric basis for the adjustment of the utility drawing (storm) 69. Once all of the independent 20 and dependent geometric vector entities 21 created in Phase I have been field verified and adjusted 63 the geometric basis for the completion of the COGO digital CSIS model is complete.

The final step in Phase II involves completing the spatial model 70 with the addition of the dependent polygons 22, dependent text 23, and independent text 24 to the drawings that comprise the COGO digital CSIS model. This data may be added to the CSIS model in any order by multiple teams working simultaneously, if desired, because the geometric elements that provide the basis for their construction are already modeled in the drawings. For the purposes of the discussion of the preferred embodiment, the completion of the property drawing, as indicated by reference numeral 71 in FIG. 16, will be discussed first.

The dependent polygon 22 representing the site area 45 is created in the property drawing on its own layer as shown in FIG. 7. This geometric element allows the site area to be determined by a simple query command on the polygon entity in the drawing. Upon completion of all of the geometric elements in the property drawing, the text elements, dependent text 23 followed by independent text 24, are created.

The dependent text 23 elements created first are the bearings, distances and curve data 53 that describe the property boundary 25. These entities are created on their own layer, as shown in FIG. 8, by querying the independent geometric vector entities 20 in the property drawing to determine the geometric data. Upon completion of these elements the dependent text 23 that represents the property corner coordinates 54 is derived from the independent geometric vector entities 20 and added to the drawing on its own layer as shown in FIG. 8. The addition of the independent text 24 to the property drawing is done after all of the independent 20 and dependent geometric vector entities 21, dependent polygons 22, and dependent text 23 have been added to the drawing. The independent text 24 identifying the adjacent owners 58 is added to the drawing on its own layer as shown in FIG. 9. Upon completion of the property drawing, as indicated by reference numeral 71 in FIG. 16, the dependent text 23 associated with the easement drawing, as indicated by reference numeral 72 in FIG. 16, is added to the CSIS model.

The dependent text 23 that describes the bearings, distances and ties to property lines 55 for the easement lines is added to the easement drawing on its own layer as shown in FIG. 8. This data is derived by querying the independent geometric vector entities 20 in the easement drawing. With the completion of the field verification, spatial model adjustment 63, and addition of the dependent text 23, the easement drawing for each respective utility is inserted into the respective utility drawing, as indicated in reference numeral 73 in FIG. 16, in this case the storm drawing, in order to consolidate the information relating to each utility.

The intent of the storm drawing, and utility drawings in general, is to show the computed easement data as recorded in the Land Records of the local jurisdiction as well as the location of the structures and pipes comprising the utility in a separate drawing for each utility. Further separation of the data within each utility drawing into as many layers as needed to show appurtenant structures, pipes and easements, allows for efficient data management. Upon completion of this task, the easement drawing no longer exists as a separate drawing in the CSIS model. The building drawing, as indicated by reference numeral 74 in FIG. 16, may be completed as the next step in the process of field verification and adjustment of the spatial model 63.

The dependent polygons 22 that define the building footprints 46 are added to the building drawing on their own layer, as shown in FIG. 7, by using the independent geometric vector entities 20 in the building drawing as a base. The independent text 24 that describes the building names 59 is added to the building drawing on its own layer, as shown in FIG. 9, to complete the building drawing. Upon completion of the building drawing, as indicated by reference numeral 74 in FIG. 16, the dependent polygons 22, dependent text 23, and independent text 24 may be added to the basemap drawing, as indicated by reference numeral 75 in FIG. 16.

The dependent polygons 22 that define the sidewalk 47, trail 48, pavement 49, parking lot 50, open space 51, and concrete pad 52 areas are added to the basemap drawing on their own layers, as shown in FIG. 7. They are created by using the independent 20 and dependent geometric vector entities 21 in the basemap drawing. Upon completion of all of the geometric entities in the basemap drawing the dependent 23 and independent text 24 may be added.

The dependent text 23 comprising the roadway geometric labels 56 is added to the basemap drawing on its own layer as shown in FIG. 8. These entities depend on the geometric entities in the basemap drawing for their values. The independent text 24 that describes the road names 60 is added to the drawing on its own layer, as shown in FIG. 9. Upon completion of the basemap drawing, as indicated in reference numeral 75 in FIG. 16, the completion of the topographic contour drawing, as indicated by reference numeral 76 in FIG. 16, may be undertaken.

The topographic contour drawing is completed by the addition of the dependent text 23 comprising the index contour labels 57 on its own layer as shown in FIG. 8. This dependent text 23 is derived from the independent geometric vector entities 20 representing the index contours 30 in the topographic contour drawing. Upon completion of the topographic contour drawing, as indicated in reference numeral 76 in FIG. 16, the last remaining drawing to be completed for the purposes of this description of the preferred embodiment is the utility drawing (storm), as indicated by reference numeral 77 in FIG. 16.

Figure 15:
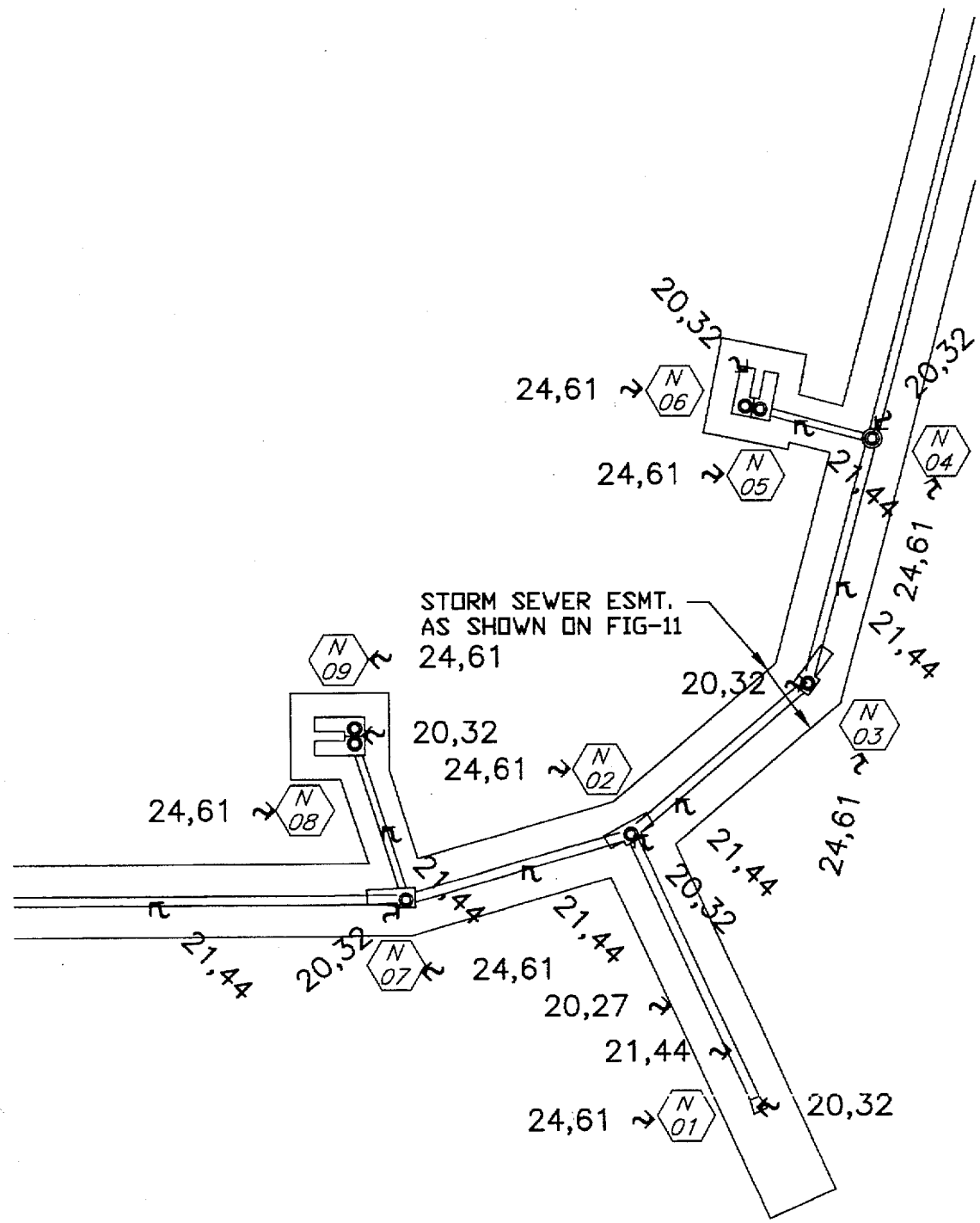
FIG. 15 shows the storm sewer infrastructure on the site including but not limited to manholes, easements, inlets, curb inlets, end walls, end sections, and underground storm sewer pipes in which each structure has definable attributes to describe in more detail material, costs, design data, and replacement or maintenance date in a utility drawing (storm)

The completion of the utility drawing (storm), as shown in FIG. 15, involves the addition of the storm sewer structure numbers 61 as independent text 24 on its own layer as shown in FIG. 9. With the completion of the utility drawing (storm), as indicated by reference numeral 77 in FIG. 16, the spatial digital model is complete and field verified.

Phase II of the CSIS method accomplishes three important goals. First, the survey control monumentation network 62 is constructed which provides the basis for horizontal and vertical control for all future survey work on the site. Second, the field verification of the data and adjustment of the independent 20 and dependent geometric vector entities 21 of the spatial model 63 is accomplished. Third, the spatial model is completed 70 with the addition of the dependent polygons 22, dependent text 23, and independent text 24 entities to the drawings. This results in the completion of the spatial portion of the database for the COGO digital CSIS model. The completion of the spatial part of the CSIS model and the mechanism for its preservation, the survey monumentation control network 62, establishes the framework for the creation of the descriptive, non-graphical portion of the digital database in Phase mi, as indicated by reference numeral 3 in FIG. 1.

PHASE III

The primary focus of Phase III, as shown by reference numeral 3 in FIG. 1, is the completion of the COGO digital CSIS model with the development of a non-spatial database, a indicated by reference numeral 10 in FIG. 1, which describes the entities in the spatial or drawing database created in the first two phases of the CSIS method. The association of non-graphical information with graphical information increases the intelligence of the COGO digital CSIS model by making data inquiry commands more comprehensive. The information resident in the non-spatial database lends itself towards data manipulation functions that are readily accommodated by a database management program as opposed to visual data management functions that are better accomplished with layer commands in the CSIS model.

A priority in the development of both the spatial and non-spatial databases is the focus on insuring that data is correct and resident in the model only once. This elimination of redundancy in the data allows the COGO digital CSIS modeler to effectively employ CSIS's drawing file referencing capability or insert information as a block into another drawing.

It is imperative to note that a competent COGO digital CSIS modeler may access the spatial and non-spatial database of the CSIS model to manage the data for infrastructure decision making without using programs linked to the CSIS program. To further the use of the CSIS model it is linked to a database management system (DBMS) program.

The method selected for use with the CSIS model to access the drawing database is to use the CAD database interface programs for accessing external databases. The COGO digital CSIS modeler must have an understanding of a relational database to continue into this phase. The infrastructure item or items selected to be linked to a DBMS must satisfy the owner's infrastructure data management needs. For example, storm sewer infrastructure items consist of pipes, manholes, curb inlets, end walls, end sections, and other items. To illustrate this part of the CSIS system a narrative on linking storm sewer pipe spatial entities of the CSIS model to an external database will be described.

The database organization must be determined before linking can occur. The considerations are: the non-spatial attributes that the owner would like to manage, the DBMS to be used, how many tables or databases, which non-spatial attributes to link to which spatial drawing entities, multiple links to the same row of data, row identification, and the output you want to the screen or to reports.

The number of databases that the COGO digital CSIS modeler can create is limitless, but the intent of the CSIS method is to create only those databases that allow infrastructure management data to be mined and reported. For the CSIS model one database may be set up for the property, buildings, basemap, topography, and each individual utility. The storm sewer database of the CSIS model will be described to show the typical database creation method.

The COGO digital CSIS modeler has to set up the database by following the three steps required to create a usable database. Step one is to define the data needed or an analysis of the existing data. Step two is data refinement to insure that only that data required to accomplish infrastructure management is used. Step three is the establishment of relationships between the attributes.

Some of the most basic elements of relational databases are data and attributes. Both have different meanings that the COGO digital CSIS modeler must understand prior to setting up the tables required to be maintained by the DBMS. Storm sewer pipe diameter is considered data whereas a group of pipes with the same diameter is an attribute. Along with this knowledge the COGO digital CSIS modeler must understand that tables are made up of columns and rows in CAD language or fields and records in DBMS language. If the database creator is familiar with today's personal computer spreadsheet programs, then the structure of a database table is very similar.

For storm sewer pipe spatial entities, several non-spatial attributes may be defined for managing the infrastructure. Those non-spatial attributes may be: size of pipe, material of the pipe, date of installation, length of the pipe, and the cost of replacement. The DBMS selected for the CSIS system is dBASE III PLUS. The COGO digital CSIS modeler may select the DBMS that they are familiar with including, but not limited to, dBASE IV, PARADOX, FOXPRO, ACCESS, INFORMIX, or ORACLE.

For the storm sewer database two tables could be set up, one for storm sewer pipes, as shown in FIG. 17, and one for storm sewer structures, as shown in FIG. 18. The storm sewer pipe table 86 may include the following columns or fields, as illustrated in FIG. 17: the pipe identification number 78, the pipe inside diameter 79, the pipe material 80, the pipe length 81, the pipe cost 82, the pipe run (from structure # to structure #) 83, the pipe installation date 84, and a pipe memo field 85. The storm sewer structure table 94 may include the following columns or fields, as shown in FIG. 18: the structure identification number 87, the structure type 88, the structure material 89, the structure length 90, the structure cost 91, the structure installation date 92, and a structure memo field 93.

Once the COGO digital CSIS modeler has determined the data required for input into the DBMS the creation of the database can begin. As with any DBMS, one must label the database in which one wants to store data. The storm sewer database may be named 'STORM' to indicate the utility being mined. The next step is to identify the tables to be created that will make up the 'STORM' database. The creation of two tables, 'STM-PIPE' 86 and 'STM-STR' 94, will be described to illustrate the typical method of table creation in CSIS. The storm sewer pipe table may be named 'STM-PIPE' 86, and the storm sewer structure table may be named 'STM-STR' 94. Each table set up in the DBMS is a database file that may be stored in the directory 'STORM' so similar files may be bundled together representing the same utility.

Now that the tables have been named, the fields within the tables can be defined. In the 'STM-PIPE' 86 table, the first field is the pipe identification number with a field name of 'PIPE_ID#' 78. The type of field is a character field and it may have a field width of 10, but not limited to this number, characters. The second field is the pipe inside diameter with a field name of 'PIPE_DIA' 79. The type of field is a numeric field and it may have a field width of 6, but not limited to this number, characters. The third field is the pipe material with a field name of 'PIPE_MAT' 80. The type of field is a character field and it may have a field width of 40, but not limited to this number, characters. The fourth field is the pipe length with a field name of 'PIPE_LENGTH' 81. The type of field is a numeric field and it may have a field width of 8, but not limited to this number, characters. The fifth field is the pipe cost with a field name of 'PIPE_COST' 82. The type of field is a numeric field and it may have a field width of 10, but not limited to this number, characters. The sixth field is the pipe run with a field name of 'PIPE_RUN' 83. The type of field is a character field and it may have a field width of 10, but not limited to this number, characters. The seventh field is the pipe installation date with a field name of 'PIPE_DATE' 84. The type of field is a date field and it may have a field width of 6 characters. The last field is a pipe memo field with a field name of 'PIPE_MEMO' 85. The type of field is a memo field and it may have a field width of 1000, but not limited to this number, characters. The pipe memo field allows the COGO digital CSIS modeler to write about each storm sewer pipe in more detail in response to the owner's request for more information on the pipe.

Upon completion of the structure of the database table 'STM-PIPE' 86 the entering of the data can begin. All of the pipe data information has to be queried from the drawing or derived from external sources of information prior to entering the data into the 'STM-PIPE' 86 table. The gathering of data for the storm sewer pipe table 86 should have been done during the plan reconciliation and field verification stage 12, 63. After the original data has been entered into the table, new data can be entered into the DBMS through the use of the 'APPEND' command.

The creation of the 'STM-PIPE' 86 table within the DBMS allows the COGO digital CSIS modeler to now access the same database file in CSIS. The same file can be changed inside the CSIS model to allow the COGO digital CSIS modeler to update the database file when the modeler has made changes to the storm sewer pipe entities. The same holds true for any drawing entity that a database file was created for with the purpose of infrastructure management in mind.

The data for the 'STM-STR' 94 table is entered in a similar fashion as the data for the 'STM-PIPE' 86 table. In the 'STM-STR' 94 table the first field is the structure identification number with a field name of 'STR_ID#' 87. The type of field is a character field and it may have a field width of 10, but not limited to this number, characters. The second field is the structure type with a field name of 'STR_TYPE' 88. The type of field is a character field and it may have a field width of 6, but not limited to this number, characters. The third field is the structure material with a field name of 'STR_MAT' 89. The type of field is a character field and it may have a field width of 40, but not limited to this number, characters. The fourth field is the structure length with a field name of 'STR_LENGTH' 90. The type of field is a numeric field and it may have a field width of 8, but not limited to this number, characters. The fifth field is the structure cost with a field name of 'STR_COST' 91. 10. The type of field is a numeric field and it may have a field width of 10, but not limited to this number, characters. The sixth field is the structure installation date with a field name of 'STR_DATE' 92. The type of field is a date field and it may have a field width of 6 characters. The last field is a structure memo field with a field name of 'STR_MEMO' 93. The type of field is a memo field and it may have a field width of 1000, but not limited to this number, characters. The structure memo field allows the COGO digital CSIS modeler to write about each storm sewer structure in more detail in response to the owner's request for more information on the structure.

Upon completion of the structure of the database table 'STM-STR' 94 the entering of the data can begin. All of the structure data information has to be queried from the drawing or derived from external sources of information prior to entering the data into the 'STM-STR' 94 table. The gathering of data for the storm sewer structure table 94 should have been done during the plan reconciliation and field verification stage 12, 63. After the original data has been entered into the table new data can be entered into the DBMS through the use of the 'APPEND' command.

The creation of the 'STM-STR' 94 table within the DBMS allows the COGO digital CSIS modeler to now access the same database file in CSIS. The same file can be changed inside the CSIS model to allow the COGO digital CSIS modeler to update the database file when the modeler has made changes to the storm sewer structure entities. The same holds true for any drawing entity that a database file was created for with the purpose of infrastructure management in mind.

PHASE IV

One of the purposes of the CSIS model is to define a data structure for infrastructure information that makes the data functional and preservable. In Phase IV, as indicated by reference numeral 4 in FIG. 1, the CSIS model, which consists of both a spatial and non-spatial database, is implemented 7 in a proactive fashion as a management tool for the following, but not limited to, activities:

1. Development

Site Plans

Site Plan Waivers

Stormwater Management Studies

Drainage Studies

Survey Coordination

Utility Relocation Plans

2. Planning

Preliminary Plans

Parking Studies

Conceptual Studies

3. Facilities Management

Capital Improvement Forecasting

Pavement Management

Sign Inventory Plans

Infrastructure Management

The CSIS model is the point of beginning for all of the above activities. The COGO digital CSIS model allows the management team to build upon the existing knowledge of the infrastructure rather than beginning from a new survey each time an infrastructure management plan is proposed for the capital assets on the site.

An example of the CSIS model as it is implemented for an infrastructure management project may be the determination of the cost to replace a storm sewer structure, NO3, and the pipe running from structures NO3 to NO2. Cost data that pertains to the cost to replace each infrastructure item is incorporated in the tables in the non-spatial database. In this example the cost data is derived from querying and reporting the cost data found in the 'STM-PIPE' 86 and 'STM-STR' 94 tables. Such a query will yield a storm replacement cost report that may appear as shown in 95. The cost data yields a cost of $4000.00 96 to replace both the structure and the pipe in this example.

In the design of any proposed improvements on the site it is important to use the CSIS model as the basis for all geometric layout. The proposed improvements are designed in a CAD digital format and kept in individual files that conform to the drawing files in the CSIS model in terms of layers. Construction plans are created by referencing the CSIS model and the proposed improvement files and adding all of the ancillary notes and text labels required by the local plan approval authority.

By focusing on digital data model product development in the CSIS method, the emphasis of the industry will shift to data preservation and data integrity as opposed to a construction plan development process that does not provide the owner with the ability to preserve and update the infrastructure data. To fully employ the benefits of computer technology available today, the infrastructure data needs to be in the functional format proposed in the CSIS model in order to allow views of the model to be created and plotted as construction drawings. By keeping the CSIS model up-to-date as changes are made to the infrastructure, the ability to employ the CSIS model as the basis for construction document creation among other uses is preserved.

PHASE V

The primary focus of Phase V, as indicated by reference numeral 5 in FIG. 1, is the asset preservation 8 of the owner's investment in the COGO digital CSIS model and associated non-graphical database. The COGO digital CSIS model must be preserved to protect the data quality and integrity. The COGO digital CSIS modeler must maintain the CSIS system to keep it as current as possible. This requires the COGO digital CSIS model be revised, updated, or added to when site improvements have occurred on the site after Phase II, as indicated by reference numeral 3 in FIG. 1, of the CSIS model has been completed.

The first step in preserving the COGO digital CSIS model is to make sure the COGO digital CSIS model has been used as the basis for any proposed site improvements. Additionally, the proposed site improvements should be developed as a digital CAD product consistent with the criteria and standards used to develop the COGO digital CSIS model. This insures the proposed improvements generated in the new digital CAD drawing can be directly imported into the CSIS model drawings created.

The second step in preserving the COGO digital CSIS model is to as-built survey the proposed improvements when construction has been completed. This allows the COGO digital CSIS modeler to reconcile the proposed improvements with the actual field measurements that reflect how the improvements were completed during construction. This also gives the owner a clear picture of how the contractor performed their duties and the accuracy and quality of their workmanship. This as-built survey work should be completed before the contractor leaves the site so that during Phase V of updating the CSIS model, the engineer can ascertain if any of the work was not in conformance with the plan and should be done over at the expense of the contractor.

The third step in preserving the COGO digital CSIS model is to reconcile the as-built survey of proposed improvements with the proposed improvements in the new digital CAD drawing to reflect the designer's intent in the updated CSIS model. This will verify if the proposed improvements were done according to the digital CAD drawing and also show changes made during construction to accommodate unforeseen conditions. Once the proposed improvements in the digital CSIS model are in harmony with the actual site improvements built, then the COGO digital CSIS modeler can move on to the next step.

The fourth step in preserving the COGO digital CSIS model is to take the digital CAD model and extract the data needed to update or add to each drawing file of the CSIS model. Each CSIS model drawing file has to be updated by inserting the reconciled proposed improvements into each applicable CSIS model drawing file. The same steps in the creation of the CSIS model as outlined in Phase I and II should used to insure consistency and data integrity. This step in the CSIS process needs to be carefully executed in order to successfully update the CSIS model. Every spatial and non-spatial entity in the CSIS model must be checked in the area of the proposed improvements. To help in organizing the updating and revision of the CSIS model a polygon, with width, should be drawn around the perimeter of the improvements so a graphical representation of the area of the CSIS model needing the update can be seen visually for constant reference.

The property drawing should be checked to see if the legal boundary of the site with bearings, distances, and curve data of each property line, coordinates of each property corner, area of the site boundary in acres and square feet with adjacent property owners shown has changed or if any non-spatial data needs to be revised. Very few changes should be required to keep this drawing current. The building drawing will have to be updated if any structure was constructed with the proposed improvements. The new building will have non-spatial data that needs to be added as well as the building perimeter and outside dimensions of each, for each building on the site along with any building information shown, and said drawing may contain underground tunnels from one building to another building. The basemap drawing will have changes made to those improvements affecting planimetric features of a site including, but not limited to: sidewalks, curb & gutters, edge of pavements, steps, stairs, retaining walls, handicap ramps, loading ramps, loading docks, asphalt ditches, concrete ditches, concrete channels, concrete pads, etc. The topographic contour drawing will be updated with the new contours and elevations labeled, that were generated from the TIN model of the proposed improvements. The utility drawing (storm) will be revised with the storm sewer infrastructure on the site including, but not limited to: manholes, easements, inlets, curb inlets, end walls, end sections, and underground storm sewer pipes in which each structure has definable attributes to describe in more detail material, costs, design data, and replacement or maintenance date. Any easements that were vacated or added can be modified in each of the CSIS model utility drawing files that were created. If the easement drawing helps facilitate or organize the revisions required to existing easements for each utility, it can be set up and used as described in Phases I and II.

The fifth step in preserving the COGO digital CSIS model is to take the digital CSIS model and extract the data needed to update or add to each external database file of the CSIS model. The COGO digital CSIS modeler now has to update the database file through the CAD program. The same file can be changed inside the DBMS program to allow the COGO digital CSIS modeler to update the database file when the CSIS modeler has made drawing changes to any drawing entity that a database file was created for the purposes of infrastructure management. The same steps in the creation of the CSIS model as outlined in Phase III should be used to insure consistency and data integrity. Each database table should be checked and updated by querying all of the data from the CSIS model drawing or from external sources prior to entering the data into the database table. The data gathering for the data should have been done during the digital CAD drawing reconciliation and field verification stage.

Asset preservation 8 of the CSIS model keeps it current for accurate data mining to derive the best infrastructure management decisions, thus allowing the owner to control the costs associated with maintenance and replacement of the site infrastructure through the life cycle of the facility.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A method for designing a civil site information system model, the method comprising the steps of:

generating a coordinate geometry digital spatial database representative of a civil site by the following steps:

gathering physical civil site information in both digital and hard copy formats;

reconciling the digital and hard copy information;

defining a common coordinate system;

generating a coordinate geometry property drawing indicative of property boundaries and storing said property drawing in a computer in a digital file;

generating a coordinate geometry building drawing indicative of buildings on said property and storing said building drawing in a computer in a digital file;

generating a coordinate geometry basemap drawing indicative of capital asset investments on said property and storing said basemap drawing in a computer in a digital file;

generating a coordinate geometry topographic contour drawing indicative of contours on- said property and storing said topographic contour drawing in a computer in a digital file;

generating at least one coordinate geometry utility drawing indicative of utility easements and utility structures on said property and storing said utility drawing in a computer in a digital file;

utilizing said common coordinate system in each of said property, building, basemap, topographic contour, and utility drawings; and generating a non-spatial database representative of elements in said civil site by the following steps:

identifying spatial entities in said spatial database which have non-spatial attributes;

defining said non-spatial attributes for each spatial entity;

linking said non-spatial attributes to each spatial entity;

storing said non-spatial attributes and said links in a computer in a database management system; and manipulating any of said spatial entities in said property, building, basemap, topographic contour, and utility drawings in said digital files to automatically update said links in said database management system.

2. The method for designing a civil site information system model recited in claim 1, wherein said step of generating a coordinate geometry property drawing comprises the steps of:

determining independent geometric vector entities from said spatial entities, said independent geometric vector entities being representative of property boundary and monuments;

entering each of said independent geometric vector entities on a single independent layer in said property digital file;

determining dependent polygon entities from said spatial entities;

relating said dependent polygon entities to said independent geometric vector entities by specified angles and distances from at least one of said independent geometric vector entities;

entering each of said dependent polygon entities on a single independent layer in said property digital file;

determining dependent text entities from said spatial entities;

relating said dependent text entities to said independent geometric vector entities by specified angles and distances from at least one of said independent geometric vector entities;

entering each of said dependent text entities on a single independent layer in said property digital file;

determining independent text entities;

relating said independent text entities to said independent geometric vector entities by specified angles and distances from at least one of said independent geometric vector entities and;

entering each of said independent text entities on a single independent layer in said property digital file.

3. The method for designing a civil site information system model recited in claim 2, wherein visual qualities selected from the group consisting of: color, line width, and line type, are assigned to each of said independent geometric vector, dependent geometric vector, dependent polygon, dependent text, and independent text entities to make each of said entities unique.

4. The method for designing a civil site information system model recited in claim 2, wherein said independent geometric vector entities represent at least a property boundary.

5. The method for designing a civil site information system model recited in claim 2, wherein said dependent polygon entities represent at least a site area.

6. The method for designing a civil site information system model recited in claim 2, wherein said dependent text entities represent at least bearings, distances, and curve data.

7. The method for designing a civil site information system model recited in claim 2, wherein said independent text entities represent at least adjacent owners.

8. The method for designing a civil site information system model recited in claim 1, wherein said step of generating a coordinate geometry building drawing comprises the steps of, determining independent geometric vector entities from said spatial entities, said independent geometric vector entities being representative of building faces;

entering each of said independent geometric vector entities on a single independent layer in said building digital file;

determining dependent polygon entities from said spatial entities;

relating said dependent polygon entities to said independent geometric vector entities by specified angles and distances from at least one of said independent geometric vector entities;

entering each of said dependent polygon entities on a single independent layer in said building digital file;

determining independent text entities;

relating said independent text entities to said independent geometric vector entities by specified angles and distances from at least one of said independent geometric vector entities; and entering each of said independent text entities on a single independent layer in said building digital file.

9. The method for designing a civil site information system model recited in claim 8, wherein said independent geometric vector entities represent at least one building face.

10. The method for designing a civil site information system model recited in claim 8, wherein said dependent polygon entities represent at least one building footprint.

11. The method for designing a civil site information system model recited in claim 8, wherein said independent text entities represent at least building labels.

12. The method for designing a civil site information system model recited in claim 1, wherein said step of generating a coordinate geometry basemap drawing comprises the steps of:

determining independent geometric vector entities from said spatial entities, said independent geometric vector entities being representative of roadway centerlines and baselines;

entering each of said independent geometric vector entities on a single independent layer in said basemap digital file;

determining dependent geometric vector entities from said spatial entities;

relating said dependent geometric vector entities to said independent geometric vector entities by specified angles and distances from at least one of said independent geometric vector entities;

entering each of said dependent geometric vector entities on a single independent layer in said basemap digital file;

determining dependent polygon entities from said spatial entities;

relating said dependent polygon entities to said independent geometric vector entities by specified angles and distances from at least one of said independent geometric vector entities;

entering each of said dependent polygon entities on a single independent layer in said basemap digital file;

determining dependent text entities from said spatial entities;

relating said dependent text entities to said independent geometric vector entities by specified angles and distances from at least one of said independent geometric vector entities;

entering each of said dependent text entities on a single independent layer in said basemap digital file;

determining independent text entities;

relating said independent text entities to said independent geometric vector entities by specified angles and distances from at least one of said independent geometric vector entities;

entering each of said independent text entities on a single independent layer in said basemap digital file.

13. The method for designing a civil site information system model recited in claim 12, wherein said independent geometric vector entities entities represent at least one element selected from the group consisting of a centerline of a roadway and a survey baseline.

14. The method for designing a civil site information system model recited in claim 12, wherein said dependent geometric vector entities represent at least one element selected from the group consisting of curbs, gutters, pavement edges, shoulders, sidewalks, trails, parking lots, and concrete pad areas.

15. The method for designing a civil site information system model recited in claim 12, wherein said dependent polygon entities represent at least one element selected from the group consisting of sidewalks, trails, pavements, parking lots, open space, and concrete pad areas.

16. The method for designing a civil site information system model recited in claim 12, wherein said dependent text entities represent at least roadway geometric labels.

17. The method for designing a civil site information system model recited in claim 12, wherein said independent text entities represent at least roadway labels.

18. The method for designing a civil site information system model recited in claim 1, wherein said step of generating a coordinate geometry topographic contour drawing comprises the steps of:

determining independent geometric vector entities from said spatial entities, said independent geometric vector entities being representative of points consisting of nodes with nothing, easting and elevation coordinates;

entering each of said independent geometric vector entities on a single independent layer in said topographic contour digital file;

determining dependent geometric vector entities from said spatial entities, relating said dependent geometric vector entities to said independent geometric vector entities by specified angles and distances from at least one of said independent geometric vector entities;

entering each of said dependent geometric vector entities on a single independent layer in said topographic contour digital file;

determining dependent text entities from said spatial entities;

relating said dependent text entities to said independent geometric vector entities by specified angles and distances from at least one of said independent geometric vector entities;

entering each of said dependent text entities on a single independent layer in said topographic contour digital file.

19. The method for designing a civil site information system model recited in claim 18, wherein said independent geometric vector entities represent at least points.

20. The method for designing a civil site information system model recited in claim 18, wherein said dependent geometric vector entities represent at least index and normal contours.

21. The method for designing a civil site information system model recited in claim 18, wherein said dependent text entities represent at least index contours labels.

22. The method for designing a civil site information system model recited in claim 1, wherein said step of generating a coordinate geometry utility drawing comprises the steps of:

determining independent geometric vector entities from said spatial entities, said independent geometric vector entities being representative of pipe centerlines, easement lines, and appurtenant structures;

entering each of said independent geometric vector entities on a single independent layer in said utility digital file;

determining dependent geometric vector entities from said spatial entities, relating said dependent polygon entities to said independent geometric vector entities by specified angles and distances from at least one of said independent geometric vector entities;

entering each of said dependent geometric vector entities on a single independent layer in said utility digital file;

determining dependent text entities from said spatial entities;

relating said dependent text entities to said independent geometric vector entities by specified angles and distances from at least one of said independent geometric vector entities;

entering each of said dependent text entities on a single independent layer in said utility digital file; determining independent text entities;

relating said independent text entities to said independent geometric vector entities by specified angles and distances from at least one of said independent geometric vector entities;

entering each of said independent text entities on a single independent layer in said utility digital file.

23. The method for designing a civil site information system model recited in claim 22, wherein said independent geometric vector entities represent at least pipe centerlines and easement lines.

24. The method for designing a civil site information system model recited in claim 22, wherein said dependent geometric vector entities represent at least one pipe.

25. The method for designing a civil site information system model recited in claim 22, wherein said dependent text entities represent at least bearings, distances and ties to property lines.

26. The method for designing a civil site information system model recited in claim 22, wherein said independent text entities represent at least structure numbers.

27. The method for designing a civil site information system model recited in claim 1, further comprising the steps of:

creating a survey control monumentation network on said site;

running a traverse through said survey control monuments;

establishing northing and easting coordinates for each of said survey control monuments establishing elevations for each of said survey control monuments;

entering a monument symbol into said property digital file;

conducting a field verification of the position of independent geometric vector entities and dependent geometric vector entities with respect to said survey control monumentation network.

28. The method for designing a civil site information system model recited in claim 27, further comprising the steps of:

adjusting the position of independent geometric vector entities and dependent geometric vector entities with respect to said survey control monumentation network to reflect the designer's original intent and the field verification findings;

addition of dependent polygon, dependent text, and independent text entities to the digital files upon completion of the adjustment of the independent geometric vector entities and dependent geometric vector entities to reflect the designer's original intent and field verification findings;

update said links in said database management system by said computer.

29. A method for designing a civil site information system model, the method comprising the steps of:

generating a coordinate geometry digital spatial database representative of a civil site by the following steps:

gathering physical civil site information in both digital and hard copy formats;

reconciling the digital and hard copy information;

defining a common coordinate system;

generating a coordinate geometry property drawing indicative of property boundaries and storing said property drawing in a computer in a digital file;

generating a coordinate geometry building drawing indicative of buildings on said property and storing said building drawing in a computer in a digital file;

generating a coordinate geometry basemap drawing indicative of capital asset investments on said property and storing said basemap drawing in a computer in a digital file;

generating a coordinate geometry topographic contour drawing indicative of contours on said property and storing said topographic contour drawing in a computer in a digital file;

generating at least one coordinate geometry utility drawing indicative of utility easements and utility structures on said property and storing said utility drawing in a computer in a digital file;

utilizing said common coordinate system in each of said property, building, basemap, topographic contour, and utility drawings;

wherein said property, building, basemap, topographic contour, and utility drawings comprises the steps of: determining independent geometric vector entities from said spatial entities; entering each of said independent geometric vector entities on a single independent layer in said digital file; determining dependent geometric vector entities from said spatial entities; relating said dependent geometric vector entities to said independent geometric vector entities by specified angles and distances from at least one of said independent geometric vector entities; entering each of said dependent geometric vector entities on a single independent layer in said digital file; determining dependent polygon entities from said spatial entities; relating said dependent polygon entities to said independent geometric vector entities by specified angles and distances from at least one of said independent geometric vector entities; entering each of said dependent polygon entities on a single independent layer in said digital file; determining dependent text entities from said spatial entities; relating said dependent text entities to said independent geometric vector entities by specified angles and distances from at least one of said independent geometric vector entities; entering each of said dependent text entities on a single independent layer in said digital file; determining independent text entities; relating said independent text entities to said independent geometric vector entities by specified angles and distances from at least one of said independent geometric vector entities; entering each of said independent text entities on a single independent layer in said digital file; and creating a survey control monumentation network on said site;

running a traverse through said survey control monuments; and conducting a field verification of the position of independent geometric vector entities and dependent geometric vector entities with respect to said survey control monumentation network; and adjusting the position of independent geometric vector entities and dependent geometric vector entities with respect to said survey control monumentation network reflect the designer's original intent and the field verification findings;

adding dependent polygons, dependent text, and independent text entities to said digital files upon completion of said adjustment of said independent geometric vector entities and dependent geometric vector entities to reflect a designer's original intent and field verification findings; and generating a non-spatial database representative of elements in said civil site by the following steps:

identifying spatial entities in said spatial database which have non-spatial attributes;

defining said non-spatial attributes for each spatial entity;

linking said non-spatial attributes to each spatial entity;

storing said non-spatial attributes and said links in a computer in a database management system.

* * * * *